US012795024B2

(12) United States Patent
Hiwatari

(10) Patent No.: US 12,795,024 B2
(45) Date of Patent: Nov. 10, 2026

(54) ELECTRONIC DEVICE, STORAGE MEDIUM, AND DEVICE SETTING SYSTEM CAPABLE OF LIMITING REFLECTION OF DEVICE SETTINGS

(71) Applicant: KYOCERA Document Solutions Inc., Osaka (JP)

(72) Inventor: Tatsuya Hiwatari, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 203 days.

(21) Appl. No.: 18/813,396

(22) Filed: Aug. 23, 2024

(65) Prior Publication Data

US 2025/0071218 A1 Feb. 27, 2025

(30) Foreign Application Priority Data

Aug. 25, 2023 (JP) ................................ 2023-136998

(51) Int. Cl.
*H04N 1/00* (2006.01)

(52) U.S. Cl.
CPC ..... *H04N 1/00326* (2013.01); *H04N 1/00344* (2013.01)

(58) Field of Classification Search
CPC ...................... H04N 1/00326; H04N 1/00344
USPC ........................................................ 358/1.15
See application file for complete search history.

(56) References Cited

U.S. PATENT DOCUMENTS

2018/0191917 A1* 7/2018 Kawamura ........ H04N 1/00129

FOREIGN PATENT DOCUMENTS

JP 2005210267 A 8/2005

* cited by examiner

*Primary Examiner* — Charlotte M Baker
(74) *Attorney, Agent, or Firm* — Alleman Hall LLP

(57) ABSTRACT

An electronic device that cooperates with a device cooperation system, the electronic device being configured to: from a code in which setting information for the electronic device is embedded, read the setting information; reflect the setting information read from the code to the electronic device when registration of the electronic device is requested to the device cooperation system and the device cooperation system has already registered or newly registered the electronic device; and refrain from reflecting the setting information read from the code to the electronic device when registration of the electronic device is requested to the device cooperation system and the device cooperation system has neither already registered nor newly registered the electronic device.

2 Claims, 26 Drawing Sheets

FIG.3

24b ORGANIZATION MANAGEMENT INFORMATION

| ORGANIZATION NAME | NUMBER OF LICENSES | . . . |
|---|---|---|
| ⋮ | ⋮ | ⋮ |
| A001 | 15 | . . . |
| ⋮ | ⋮ | ⋮ |

FIG.4

24c USER MANAGEMENT INFORMATION

| USER ID | ORGANIZATION NAME | • • • |
| --- | --- | --- |
| ⋮ | ⋮ | ⋮ |
| U001 | A001 | • • • |
| ⋮ | ⋮ | ⋮ |

FIG.5

24d DEVICE MANAGEMENT INFORMATION

| SERIAL NUMBER | IP ADDRESS | DEVICE ADMINISTRATOR AUTHENTICATION INFORMATION | Admin PIN | ORGANIZATION NAME | ・・・ |
|---|---|---|---|---|---|
| ⋮ | ⋮ | ⋮ | ⋮ | ⋮ | ⋮ |
| D00001 | ○○○.○○○.○○○.○○○ | ID: U123456<br>PASSWORD : ABCDEFG | 1234 | A001 | ・・・ |
| ⋮ | ⋮ | ⋮ | ⋮ | ⋮ | ⋮ |

FIG.7

37b ELECTRONIC DEVICE INFORMATION

| | |
|---|---|
| SERIAL NUMBER | D00001 |
| IP ADDRESS | OOO.OOO.OOO.OOO |
| DEVICE ADMINISTRATOR AUTHENTICATION INFORMATION | ID: U123456<br>PASSWORD : ABCDEFG |
| ⋮ | ⋮ |

FIG.8

37c PROGRAM SETTING INFORMATION

| | |
|---|---|
| DOMAIN NAME | ○○○.○○.○○ |
| ORGANIZATION NAME | A001 |
| Admin PIN | 1234 |
| Proxy ON/OFF | ON |
| Proxy IP Address/Hostname | ○○○.○○○.○○○.○○○ |
| Proxy Port number | 8080 |
| Proxy Auth ON/OFF | ON |
| Proxy username | U00001 |
| Proxy Password | abcdefgh |
| ⋮ | ⋮ |

ELECTRONIC DEVICE, STORAGE MEDIUM, AND DEVICE SETTING SYSTEM CAPABLE OF LIMITING REFLECTION OF DEVICE SETTINGS

INCORPORATION BY REFERENCE

This application is based upon and claims the benefit of priority from the corresponding Japanese Patent Application No. 2023-136998 filed on Aug. 25, 2023, the entire contents of which are incorporated herein by reference.

BACKGROUND

The present disclosure relates to an electronic device, a storage medium, and a device setting system that reflect settings for the electronic device.

Conventionally, image input devices have been known that read settings from codes in which settings are embedded and reflect the read settings to themselves.

SUMMARY

An electronic device according to the present disclosure is an electronic device that cooperates with a device cooperation system, the electronic device being configured to: from a code in which setting information for the electronic device is embedded, read the setting information; reflect the setting information read from the code to the electronic device when registration of the electronic device is requested to the device cooperation system and the device cooperation system has already registered or newly registered the electronic device; and refrain from reflecting the setting information read from the code to the electronic device when registration of the electronic device is requested to the device cooperation system and the device cooperation system has neither already registered nor newly registered the electronic device.

A storage medium according to the present disclosure is a computer-readable recording medium on which a setting reflection program is recorded for causing an electronic device that cooperates with a device cooperation system to execute: an operation of, from a code in which setting information for the electronic device is embedded, reading the setting information; an operation of reflecting the setting information read from the code to the electronic device when registration of the electronic device is requested to the device cooperation system and the device cooperation system has already registered or newly registered the electronic device; and an operation of refraining from reflecting the setting information read from the code to the electronic device when registration of the electronic device is requested to the device cooperation system and the device cooperation system has neither already registered nor newly registered the electronic device.

A device setting system according to the present disclosure comprises: an electronic device; and a device cooperation system configured to cooperate with the electronic device, the electronic device is configured to: from a code in which setting information for the electronic device is embedded, read the setting information; reflect the setting information read from the code to the electronic device when registration of the electronic device is requested to the device cooperation system and the device cooperation system has already registered or newly registered the electronic device; and refrain from reflecting the setting information read from the code to the electronic device when registration of the electronic device is requested to the device cooperation system and the device cooperation system has neither already registered nor newly registered the electronic device.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 3 shows an example of organization management information shown in FIG. 2.

FIG. 4 shows an example of user management information shown in FIG. 2.

FIG. 5 shows an example of device management information shown in FIG. 2.

FIG. 7 shows an example of electronic device information shown in FIG. 6.

FIG. 8 shows an example of program setting information shown in FIG. 6.

DETAILED DESCRIPTION

Hereinafter, embodiments of the present disclosure will be described with reference to the drawings.

First Embodiment

First, a configuration of an image processing system as a device setting system according to a first embodiment of the present disclosure will be described.

Figure 1:
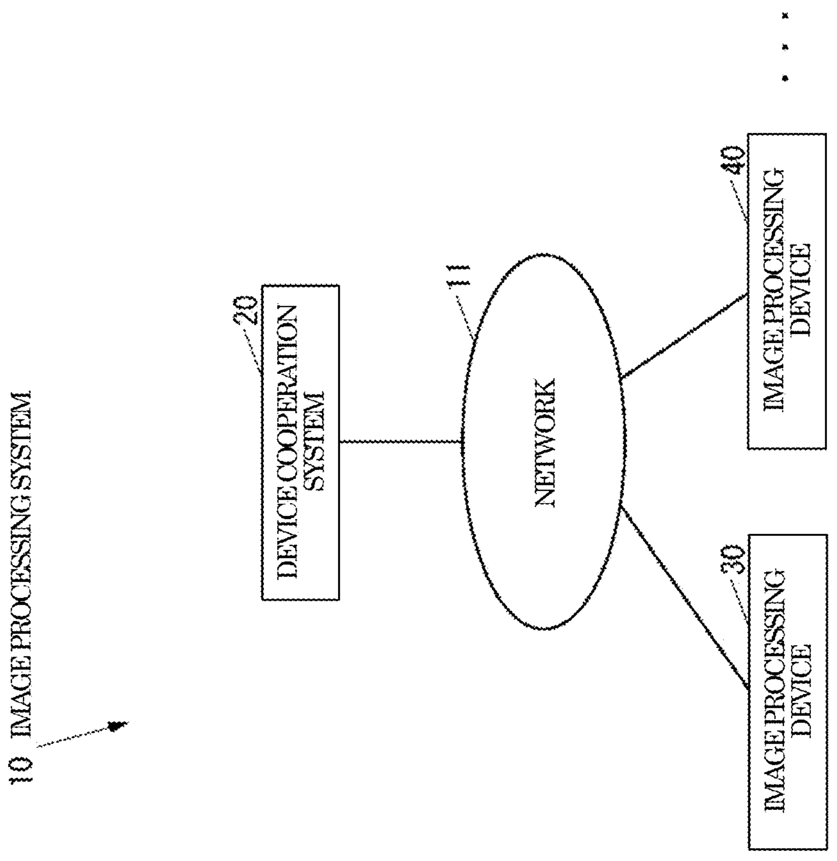
FIG. 1 is a block diagram of an image processing system according to a first embodiment of the present disclosure.

FIG. 1 is a block diagram of an image processing system 10 according to the present embodiment.

As shown in FIG. 1, the image processing system 10 includes a device cooperation system 20 that cooperates with an image processing device as an electronic device. The device cooperation system 20 cooperates with the image processing device to implement cloud printing, which is a function of, for example, downloading a print job stored on the cloud to the image processing device and causing the image processing device to execute the downloaded print job, and cloud scanning, which is a function of uploading scan data read from a document sheet by the image processing device to the cloud. The device cooperation system 20 may be configured by a single computer, such as a personal computer (PC), or may be configured by a plurality of computers. The device cooperation system 20 may be realized on the cloud.

The image processing system 10 includes an image processing device 30 and an image processing device 40. The image processing system 10 may include at least one image processing device in addition to the image processing device 30 and the image processing device 40. The image processing device may be configured by a multifunction peripheral (MFP), a printer-only machine, a scanner-only machine, or the like.

The device cooperation system 20 and the image processing device can communicate with each other via a network 11 such as the Internet, for example.

Figure 2:
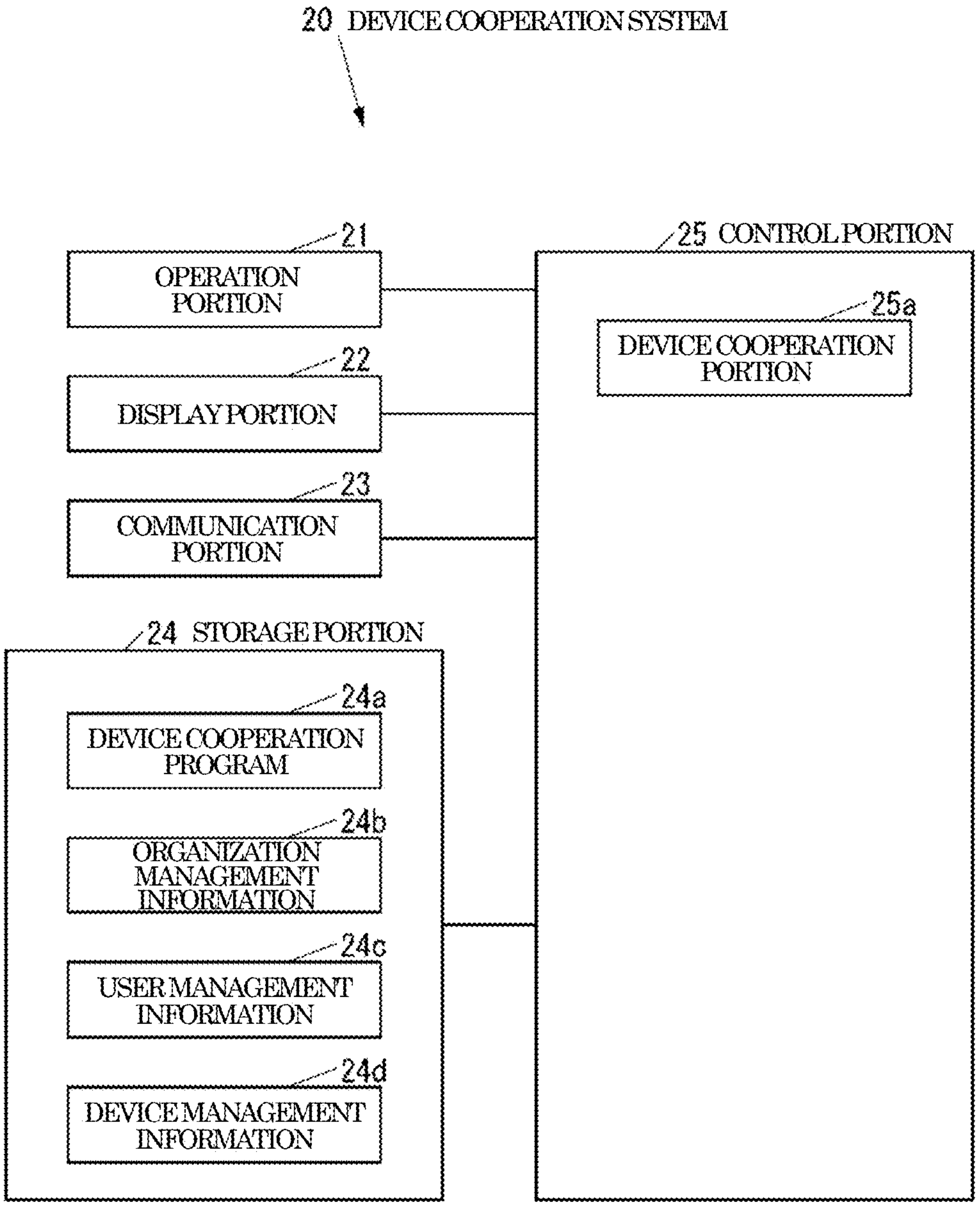
FIG. 2 is a block diagram of an example of a device cooperation system shown in FIG. 1 when configured by a single computer.

FIG. 2 is a block diagram of an example of the device cooperation system 20 when configured by a single computer.

As shown in FIG. 2, the device cooperation system 20 includes: an operation portion 21, which is an operation device such as a keyboard or a mouse, through which various operations are input; a display portion 22, which is a display device such as a liquid crystal display (LCD), which displays various types of information; a communication portion 23, which is a communication device which communicates with an external device via a network such as a local area network (LAN) or the Internet, or directly by wire or wirelessly without using a network; a storage portion 24, which is a non-volatile storage device such as a semiconductor memory or a hard disk drive (HDD), which stores various types of information; and a control portion 25 which controls the entire device cooperation system 20.

The storage portion 24 can store a device cooperation program 24*a* for cooperation with the image processing device. For example, the device cooperation program 24*a* may be installed in the device cooperation system 20 at the manufacturing stage of the device cooperation system 20, may be additionally installed in the device cooperation system 20 from an external storage medium such as a universal serial bus (USB) memory, or may be additionally installed in the device cooperation system 20 from the network.

The storage portion 24 stores organization management information 24*b* for managing organizations that use the device cooperation system 20.

FIG. 3 shows an example of the organization management information 24*b*.

As shown in FIG. 3, the organization management information 24*b* includes, for each organization, an organization name as organization identification information and the number of licenses indicating the number of image processing devices authorized to cooperate with the device cooperation system 20.

As shown in FIG. 2, the storage portion 24 stores user management information 24*c* for managing users who use the device cooperation system 20.

FIG. 4 shows an example of the user management information 24*c*.

As shown in FIG. 4, the user management information 24*c* includes, for each user, a user ID as user identification information and the organization name of the organization to which the user belongs.

As shown in FIG. 2, the storage portion 24 stores device management information 24*d* for managing image processing devices that cooperate with the device cooperation system 20.

FIG. 5 shows an example of the device management information 24*d*.

As shown in FIG. 5, the device management information 24*d* includes, for each image processing device, a serial number as identification information of the image processing device, an IP address of the image processing device, authentication information such as an ID of the administrator of the image processing device and a password (hereinafter referred to as "device administrator authentication information"), authentication information such as a personal identification number (PIN) code of the administrator of the system cooperation program of the image processing device to be described later (hereinafter referred to as "program administrator authentication information"), and the organization name of the organization to which the image processing device belongs.

The IP address of the image processing device is information used by the device cooperation system 20 to cooperate with the image processing device.

The device administrator authentication information is information used when changing various settings in the image processing device from the device cooperation system 20.

Hereinafter, the program administrator authentication information will be expressed as "Admin PIN".

The control portion 25 shown in FIG. 2 includes, for example, a central processing unit (CPU), a read only memory (ROM), which stores programs and various types of data, and a random access memory (RAM) as a memory used as a work area of the CPU of the control portion 25. The CPU of the control portion 25 executes programs stored in the storage portion 24 or the ROM of the control portion 25.

The control portion 25 executes the device cooperation program 24*a* to implement a device cooperation portion 25*a* that cooperates with the image processing device.

The device cooperation portion 25*a* can provide a web page to be accessed from a web browser of a computer such as a PC. In this web page, for example, the "Admin PIN" value of each image processing device in the device management information 24*d* can be changed in accordance with an instruction from an external computer.

The device cooperation portion 25*a* can handle only the image processing devices whose serial numbers are registered in the device management information 24*d* as image processing devices to cooperate with for cloud printing and cloud scanning.

By the way, an image input device that reads settings from a code in which settings are embedded and reflects the read settings to itself is known as related art.

However, in the image input device according to the above-described related art, the settings read from the code are always reflected to itself; therefore, there is a problem that the reflection of the settings cannot be limited.

In contrast, in the image processing system 10 according to the present embodiment of the present disclosure, the reflection of settings can be limited as will be described below.

Figure 6:
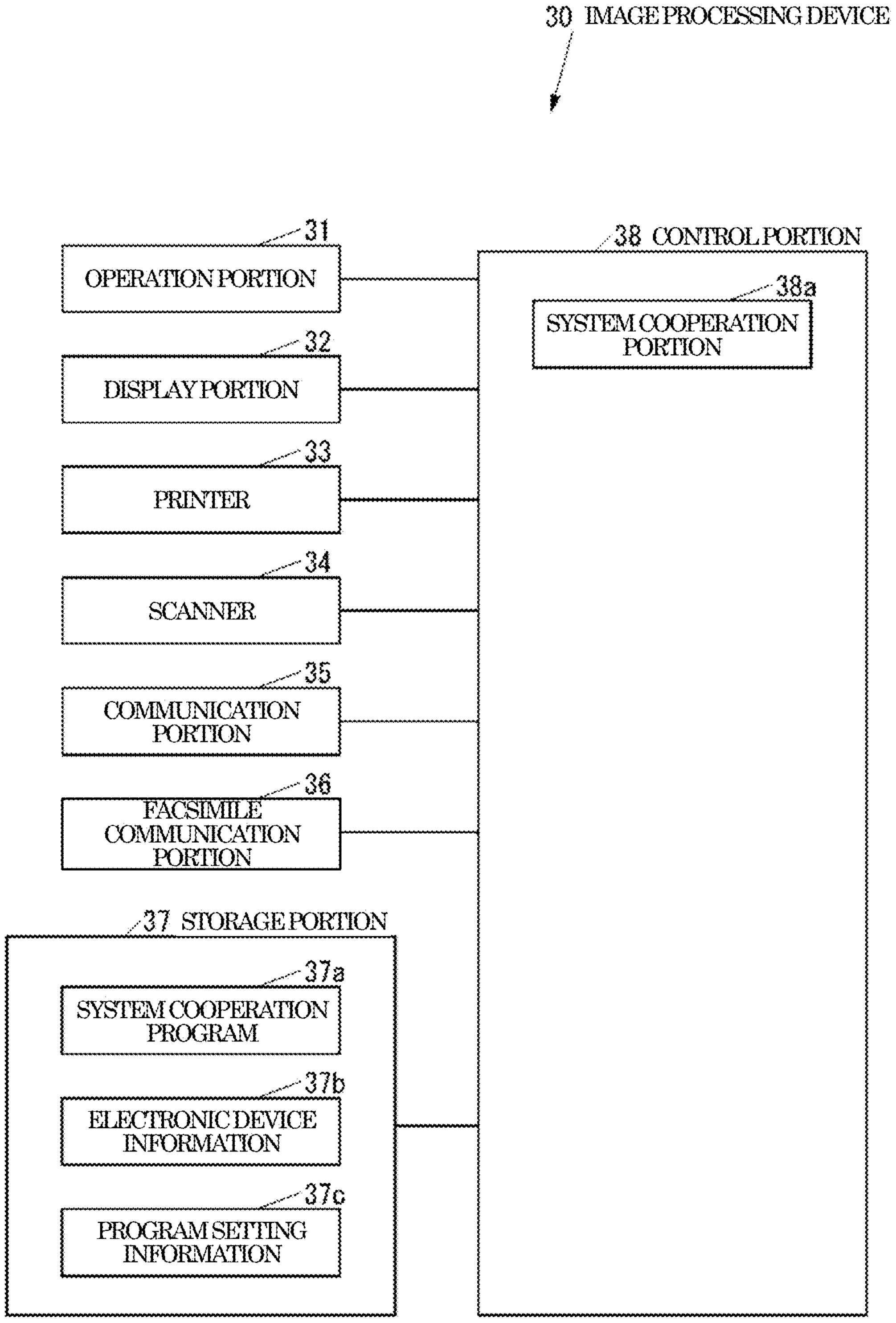
FIG. 6 is a block diagram of an example of an image processing device shown in FIG. 1 when configured by an MFP.

FIG. 6 is a block diagram of an example of the image processing device 30 when configured by an MFP.

As shown in FIG. 6, the image processing device 30 includes: an operation portion 31, which is an operation device such as buttons, through which various operations are input; a display portion 32, which is a display device such as an LCD, which displays various types of information; a printer 33, which is a printing device that prints an image on a recording medium such as a sheet; a scanner 34, which is a reading device that reads an image from a document sheet; a communication portion 35, which is a communication device that communicates with an external device via a network such as a LAN or the Internet, or directly by wire or wirelessly without using a network; a facsimile communication portion 36, which is a facsimile device that performs facsimile communication with an external facsimile device (not shown) via a communication line such as a public telephone line; a storage portion 37, which is a non-volatile storage device such as a semiconductor memory or an HDD, which stores various types of information; and a control portion 38 which controls the entire image processing device 30.

The storage portion 37 can store a system cooperation program 37*a* for cooperation with the device cooperation system 20 (see FIG. 1). For example, the system cooperation program 37*a* may be installed in the image processing device 30 at the manufacturing stage of the image processing device 30, may be additionally installed in the image processing device 30 from an external storage medium, such as a USB memory, or may be additionally installed in the image processing device 30 from the network. The system cooperation program 37*a* constitutes a setting reflection program of the present disclosure.

The storage portion 37 can store electronic device information 37*b* indicating various types of information of the image processing device 30.

FIG. 7 shows an example of the electronic device information 37*b*.

As shown in FIG. 7, the electronic device information 37*b* includes a serial number of the image processing device 30, an IP address of the image processing device 30, and device administrator authentication information of the administrator of the image processing device 30.

As shown in FIG. 6, the storage portion 37 can store program setting information 37*c* indicating settings for the system cooperation program 37*a*.

FIG. 8 shows an example of the program setting information 37*c*.

As shown in FIG. 8, the program setting information 37*c* includes: the domain name of the device cooperation system 20; the organization name of the organization to which the image processing device 30 belongs; "Admin PIN" of the system cooperation program 37*a*; "Proxy ON/OFF" indicating whether or not to use a proxy server for connection to the device cooperation system 20; "Proxy IP Address/Hostname" indicating the IP address or host name of the proxy server used for connection to the device cooperation system 20; "Proxy Port number" indicating the port number used for communication with the proxy server used for connection to the device cooperation system 20; "Proxy Auth ON/OFF" indicating whether or not to execute authentication when connecting to the proxy server used for connection to the device cooperation system 20; "Proxy username" indicating the user name used for authentication when connecting to the proxy server used for connection to the device cooperation system 20; and "Proxy Password" indicating the password used for authentication when connecting to the proxy server used for connection to the device cooperation system 20.

The control portion 38 shown in FIG. 6 includes, for example, a CPU, a ROM, which stores programs and various types of data, and a RAM as a memory used as a work area of the CPU of the control portion 38. The CPU of the control portion 38 executes programs stored in the storage portion 37 or the ROM of the control portion 38.

The control portion 38 executes the system cooperation program 37*a* to implement a system cooperation portion 38*a* that cooperates with the device cooperation system 20.

The configurations of the image processing devices other than the image processing device 30, such as the image processing device 40 (see FIG. 1), are the same as those of the image processing device 30, and the description thereof will be omitted.

Next, an operation of the image processing system 10 will be described.

First, an operation of the image processing device 30 when displaying a screen for the administrator of the system cooperation program 37*a* (hereinafter referred to as a "program administrator screen") will be described.

The user of the image processing device 30 can instruct the image processing device 30 to display the program administrator screen through the operation portion 31. The system cooperation portion 38*a* of the image processing device 30 executes the operation shown in FIG. 9 when instructed to display the program administrator screen.

Figure 9:
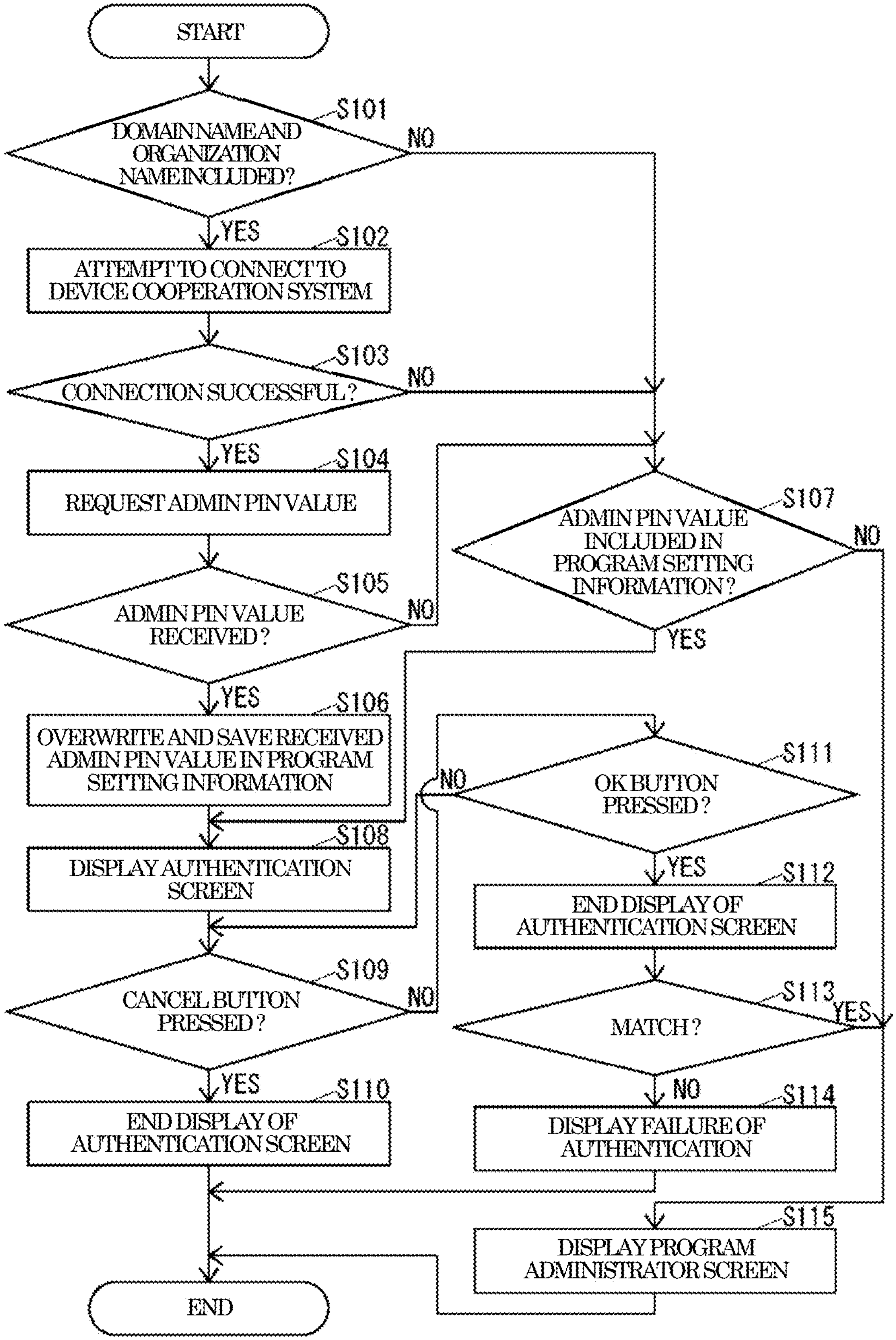
FIG. 9 is a flowchart of an operation of the image processing device shown in FIG. 6 when a program administrator screen is displayed.

FIG. 9 is a flowchart of the operation of the image processing device 30 when displaying the program administrator screen.

As shown in FIG. 9, the system cooperation portion 38*a* determines whether or not the domain name and the organization name are included in the program setting information 37*c* (S101).

When the system cooperation portion 38*a* determines in S101 that the domain name and the organization name are included in the program setting information 37*c*, the system cooperation portion 38*a* attempts to connect to the device cooperation system 20 using the domain name and the organization name included in the program setting information 37*c* (S102). Here, when settings related to a proxy server are included in the program setting information 37*c*, the system cooperation portion 38*a* attempts to connect to the device cooperation system 20 also using the settings related to the proxy server included in the program setting information 37*c*.

When the process of S102 is completed, the system cooperation portion 38*a* determines whether or not the connection to the device cooperation system 20 was successful (S103).

When the system cooperation portion 38*a* determines in S103 that the connection to the device cooperation system 20 was successful, the system cooperation portion 38*a* requests the "Admin PIN" value for the system cooperation program 37*a* from the device cooperation system 20 (S104). The system cooperation portion 38*a* includes the serial number of the image processing device 30 in the request in S104. When the device cooperation portion 25*a* of the device cooperation system 20 receives the request in S104, if there is an "Admin PIN" value associated in the device management information 24*d* with the serial number included in the request in S104, the device cooperation portion 25*a* returns the "Admin PIN" value to the image processing device 30. On the other hand, if there is no "Admin PIN" value associated in the device management information 24*d* with the serial number included in the request in S104, the device cooperation portion 25*a* replies to the image processing device 30 that there is no corresponding "Admin PIN" value.

When the process of S104 is completed, the system cooperation portion 38*a* of the image processing device 30 determines whether or not the "Admin PIN" value requested in S104 has been received from the device cooperation system 20 (S105). When the "Admin PIN" value is returned from the device cooperation system 20, the system cooperation portion 38*a* determines that the "Admin PIN" value requested in S104 has been received from the device cooperation system 20. On the other hand, when the system cooperation portion 38*a* receives a reply stating that there is no corresponding "Admin PIN" value from the device cooperation system 20, the system cooperation portion 38*a* determines that the "Admin PIN" value requested in S104 has not been received from the device cooperation system 20.

When it is determined in S105 that the "Admin PIN" value requested in S104 has been received from the device cooperation system 20, the system cooperation portion 38*a* overwrites and saves the "Admin PIN" value received from the device cooperation system 20 in the program setting information 37*c* (S106).

When it is determined in S101 that the domain name and the organization name are not included in the program setting information 37*c*, when it is determined in S103 that the connection to the device cooperation system 20 was not successful, or when it is determined in S105 that the "Admin PIN" value requested in S104 has not been received from the device cooperation system 20, the system cooperation portion 38*a* determines whether or not an "Admin PIN" value is included in the program setting information 37*c* (S107).

When the process of S106 is completed or when it is determined in S107 that an "Admin PIN" value is included in the program setting information 37*c*, the system cooperation portion 38*a* displays on the display portion 32 an authentication screen 50 (see FIG. 10) of the administrator of the system cooperation program 37*a* (S108).

Figure 10:
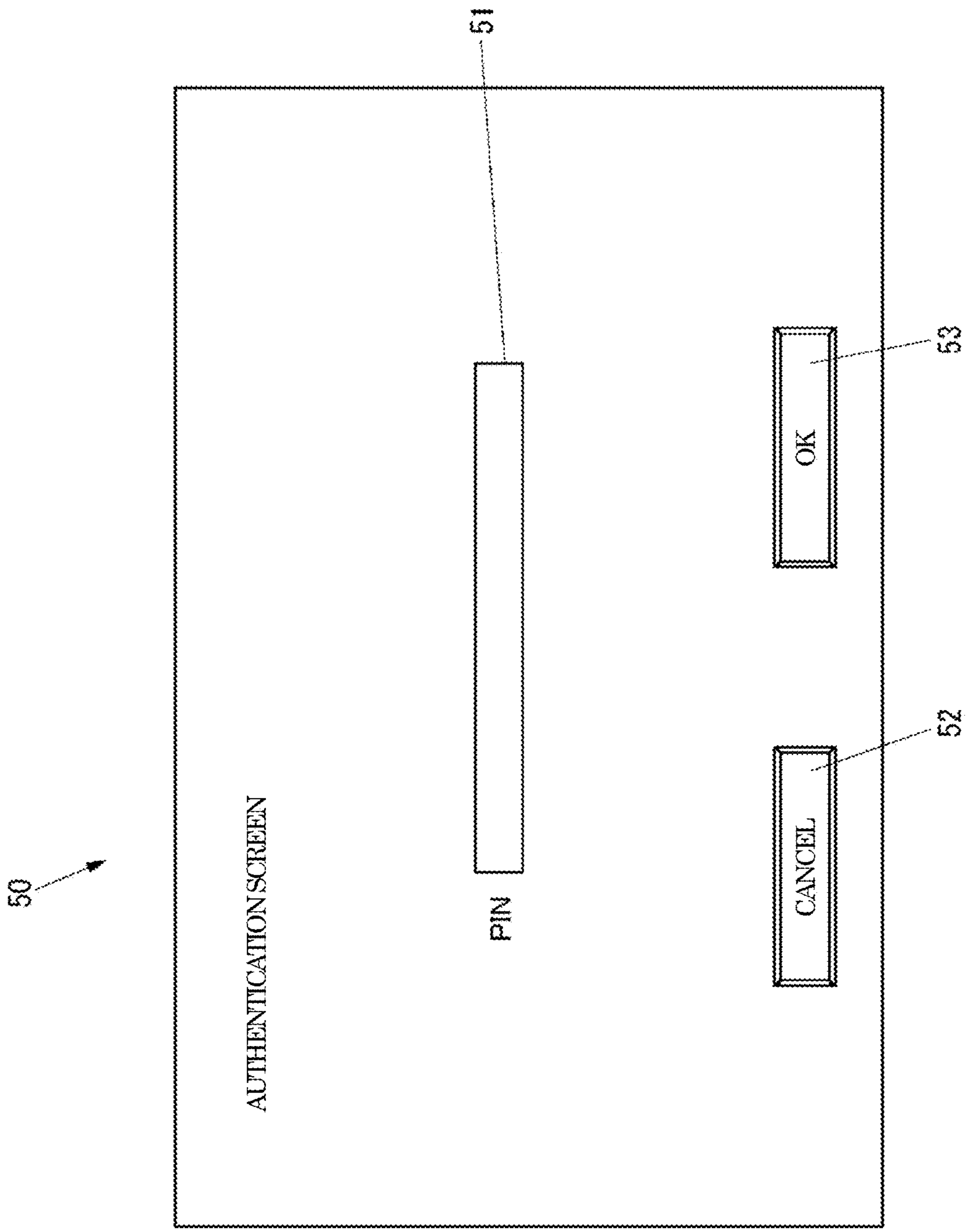
FIG. 10 shows an example of an authentication screen displayed in the operation shown in FIG. 9.

FIG. 10 is a diagram showing an example of the authentication screen 50.

The authentication screen 50 shown in FIG. 10 includes a text box 51 for inputting an "Admin PIN" value, a cancel button 52, and an OK button 53.

As shown in FIG. 9, when the process of S108 is completed, the system cooperation portion 38*a* determines whether or not the cancel button 52 has been pressed (S109).

When the system cooperation portion 38*a* determines in S109 that the cancel button 52 has been pressed, the system cooperation portion 38*a* ends the display of the authentication screen 50 on the display portion 32 (S110), and ends the operation shown in FIG. 9.

When the system cooperation portion 38*a* determines in S109 that the cancel button 52 has not been pressed, the system cooperation portion 38*a* determines whether or not the OK button 53 has been pressed (S111).

When the system cooperation portion 38*a* determines in S111 that the OK button 53 has not been pressed, the system cooperation portion 38*a* executes the process of S109.

When the system cooperation portion 38*a* determines in S111 that the OK button 53 has been pressed, the system cooperation portion 38*a* ends the display of the authentication screen 50 on the display portion 32 (S112).

When the process of S112 is completed, the system cooperation portion 38*a* determines whether or not the information input in the text box 51 when the OK button 53 is pressed matches the "Admin PIN" value included in the program setting information 37*c* (S113).

When the system cooperation portion 38*a* determines in S113 that the information input in the text box 51 when the OK button 53 is pressed does not match the "Admin PIN" value included in the program setting information 37*c*, the system cooperation portion 38*a* displays on the display portion 32 that the authentication has failed (S114), and ends the operation shown in FIG. 9.

When the system cooperation portion 38*a* determines in S107 that the "Admin PIN" value is not included in the program setting information 37*c*, or when the system cooperation portion 38*a* determines in S113 that the information input in the text box 51 when the OK button 53 is pressed matches the "Admin PIN" included in the program setting information 37*c*, the system cooperation portion 38*a* displays the program administrator screen 60 (see FIG. 11) on the display portion 32 (S115), and ends the operation shown in FIG. 9.

Figure 11:
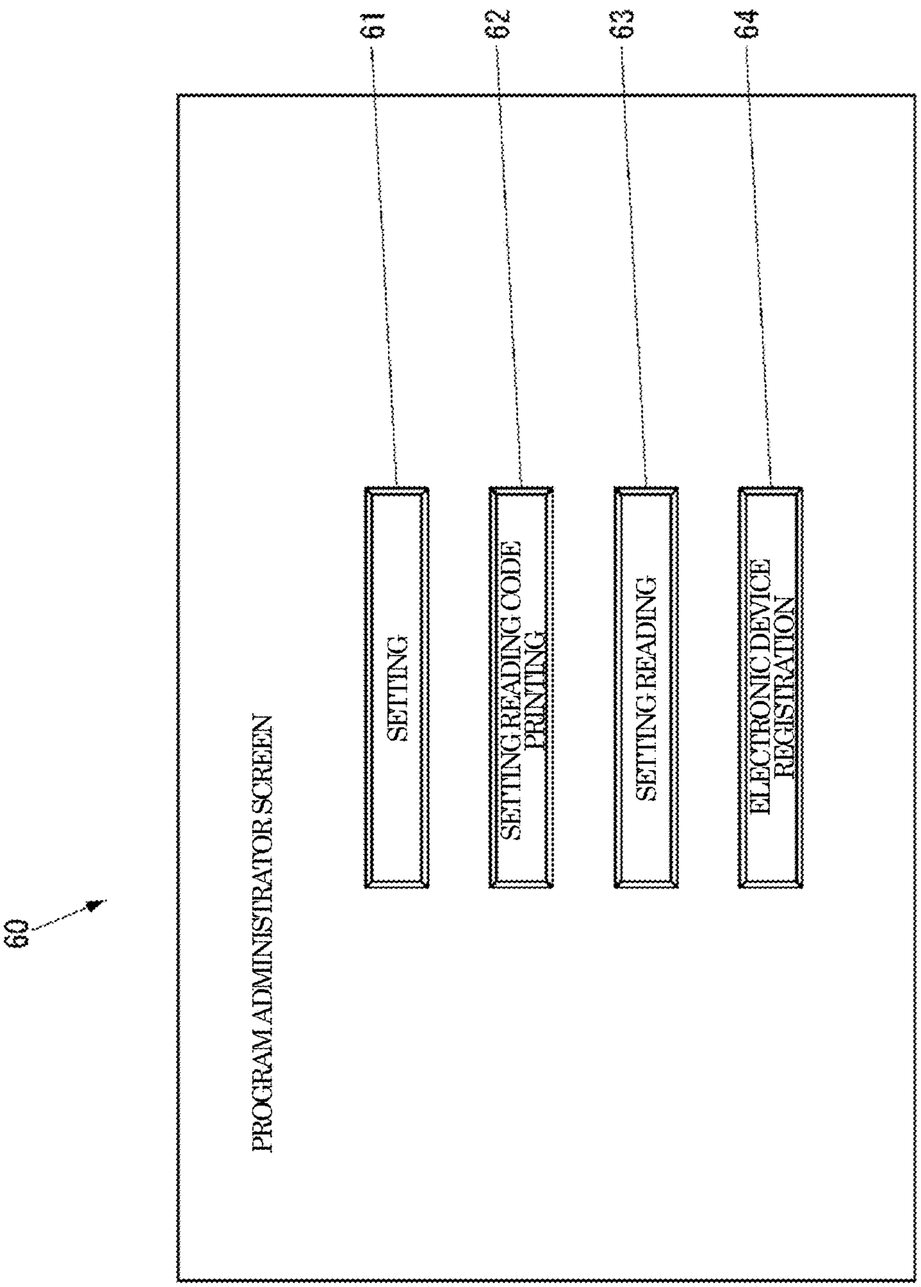
FIG. 11 shows an example of the program administrator screen displayed in the operation shown in FIG. 9.

FIG. 11 shows an example of the program administrator screen 60.

The program administrator screen 60 shown in FIG. 11 includes: a setting button 61 for manually inputting settings; a setting reading code printing button 62 for printing a code (hereinafter referred to as a "setting reading code") for the image processing device to read the settings indicated in the program setting information 37*c*; a setting reading button 63 for reading the settings from the setting reading code; and an electronic device registration button 64 for registering the image processing device 30 in the device cooperation system 20.

Next, the operation of the image processing device 30 when settings are manually input to the program setting information 37*c* will be described.

Figure 12:
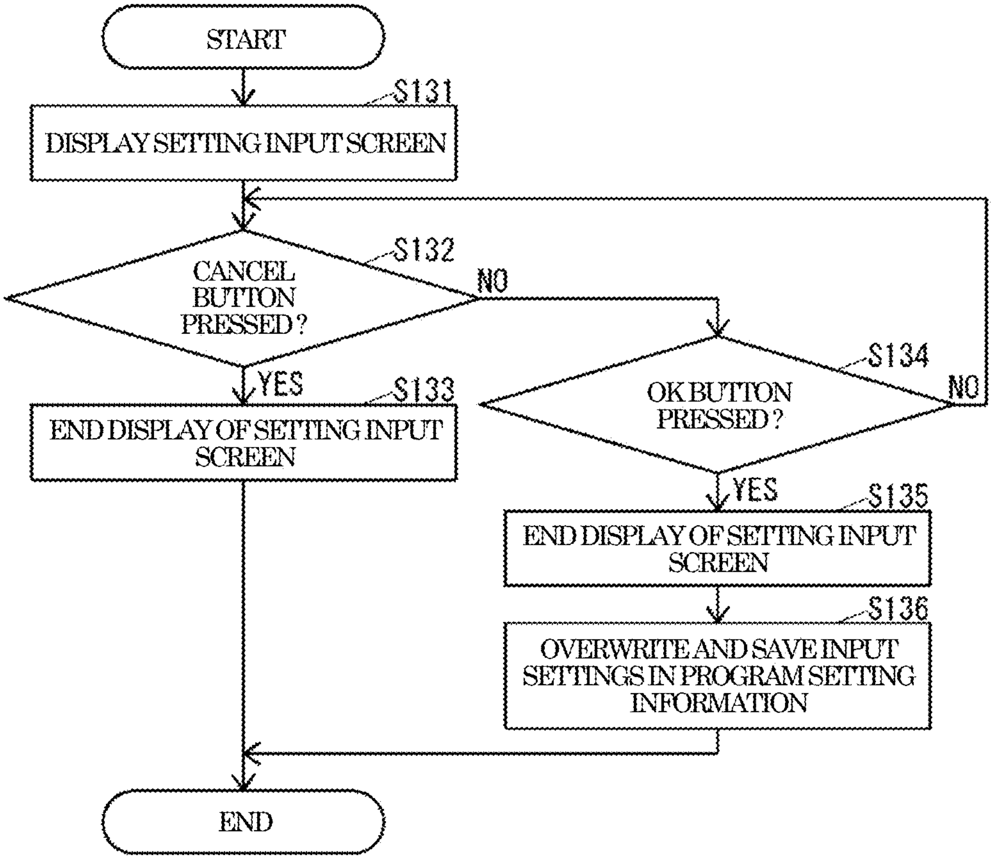
FIG. 12 is a flowchart of an operation of the image processing device shown in FIG. 6 when settings are manually input to the program setting information.

The system cooperation portion 38*a* of the image processing device 30 executes the operation shown in FIG. 12 when the setting button 61 on the program administrator screen 60 is pressed.

FIG. 12 is a flowchart of the operation of the image processing device 30 when settings are manually input to the program setting information 37*c*.

As shown in FIG. 12, the system cooperation portion 38*a* displays on the display portion 32 a setting input screen 70 (see FIG. 13) for manually inputting settings (S131).

Figure 13:
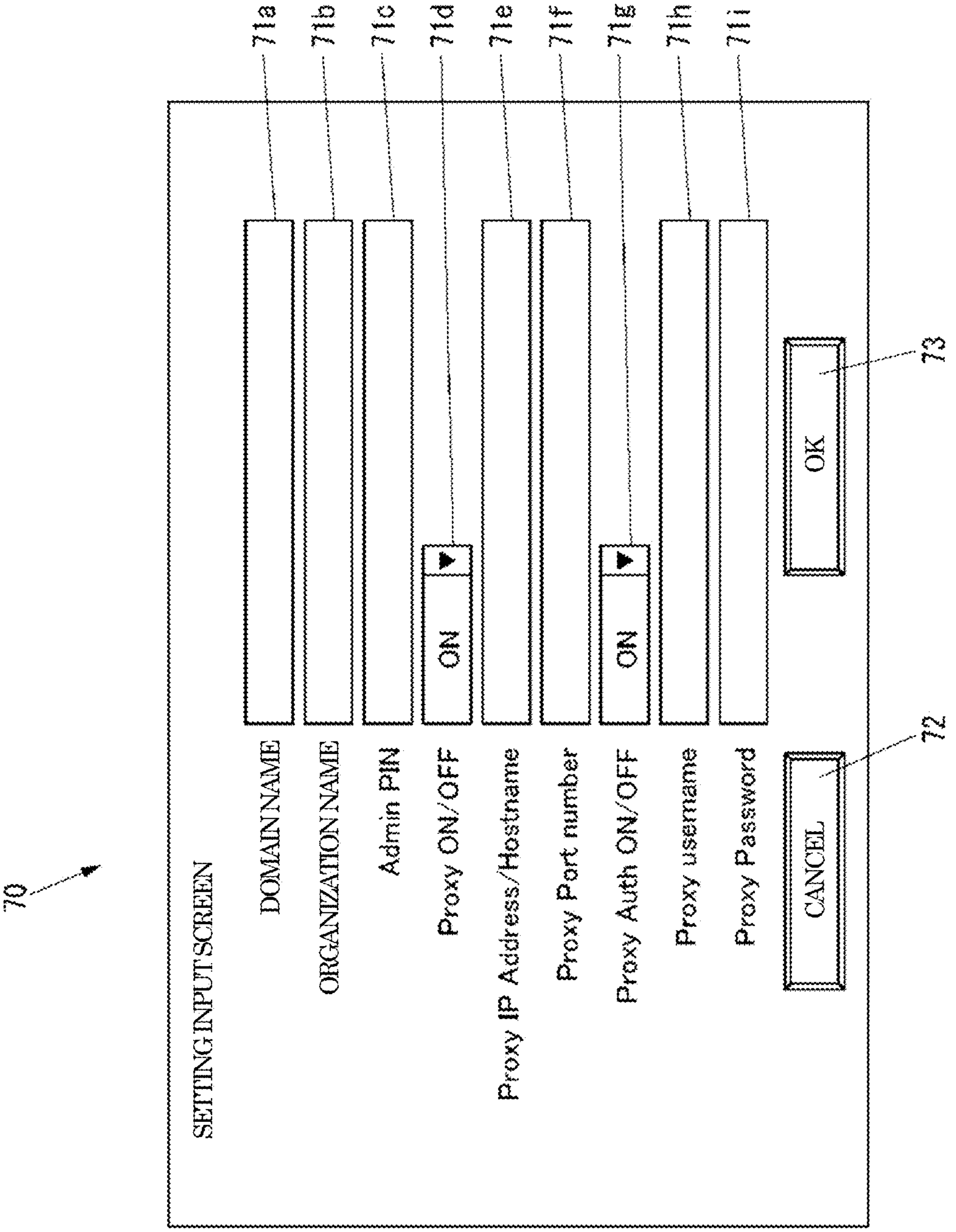
FIG. 13 shows an example of a setting input screen displayed in the operation shown in FIG. 12.

FIG. 13 shows an example of the setting input screen 70.

The setting input screen 70 shown in FIG. 13 includes: a text box 71*a* for inputting the domain name of the device cooperation system 20; a text box 71*b* for inputting the organization name of the organization to which the image processing device 30 belongs; a text box 71*c* for inputting the "Admin PIN" value of the system cooperation program 37*a*; a drop-down list 71*d* for selecting a "Proxy ON/OFF" value indicating whether or not to use a proxy server for connection to the device cooperation system 20; a text box 71*e* for inputting a "Proxy IP Address/Hostname" value indicating the IP address or host name of the proxy server used for connection to the device cooperation system 20; a text box 71*f* for inputting a "Proxy Port number" value indicating the port number used for communication with the proxy server used for connection to the device cooperation system 20; a drop-down list 71*g* for selecting a "Proxy Auth ON/OFF" value indicating whether or not to execute authentication when connecting to the proxy server used for connection to the device cooperation system 20; a text box 71*h* for inputting a "Proxy username" value indicating the user name used for authentication executed when connecting to the proxy server used for connection to the device cooperation system 20; a text box 71*i* for inputting a "Proxy Password" value indicating the password used for authentication executed when connecting to the proxy server used for connection to the device cooperation system 20; a cancel button 72; and an OK button 73.

When displaying the setting input screen 70 on the display portion 32 in S131, the system cooperation portion 38*a* may reflect the setting values included in the program setting information 37*c* on the setting input screen 70.

As shown in FIG. 12, when the process of S131 is completed, the system cooperation portion 38*a* determines whether or not the cancel button 72 has been pressed (S132).

When the system cooperation portion 38*a* determines in S132 that the cancel button 72 has been pressed, the system cooperation portion 38*a* ends the display of the setting input screen 70 on the display portion 32 (S133), and ends the operation shown in FIG. 12. Accordingly, the program administrator screen 60 (see FIG. 11) is displayed again on the display portion 32.

When the system cooperation portion 38*a* determines in S132 that the cancel button 72 has not been pressed, the system cooperation portion 38*a* determines whether or not the OK button 73 has been pressed (S134).

When the system cooperation portion 38*a* determines in S134 that the OK button 73 has not been pressed, the system cooperation portion 38*a* executes the process of S132.

When the system cooperation portion 38*a* determines in S134 that the OK button 73 has been pressed, the system cooperation portion 38*a* ends the display of the setting input screen 70 on the display portion 32 (S135). Accordingly, the program administrator screen 60 (see FIG. 11) is displayed again on the display portion 32.

When the process of S135 is completed, the system cooperation portion 38*a* overwrites and saves the settings input on the setting input screen 70 when the OK button 73 is pressed in the program setting information 37*c* (S136), and ends the operation shown in FIG. 12.

Next, an operation of the image processing system 10 when the image processing device 30 is registered in the device cooperation system 20 will be described.

Figure 14:
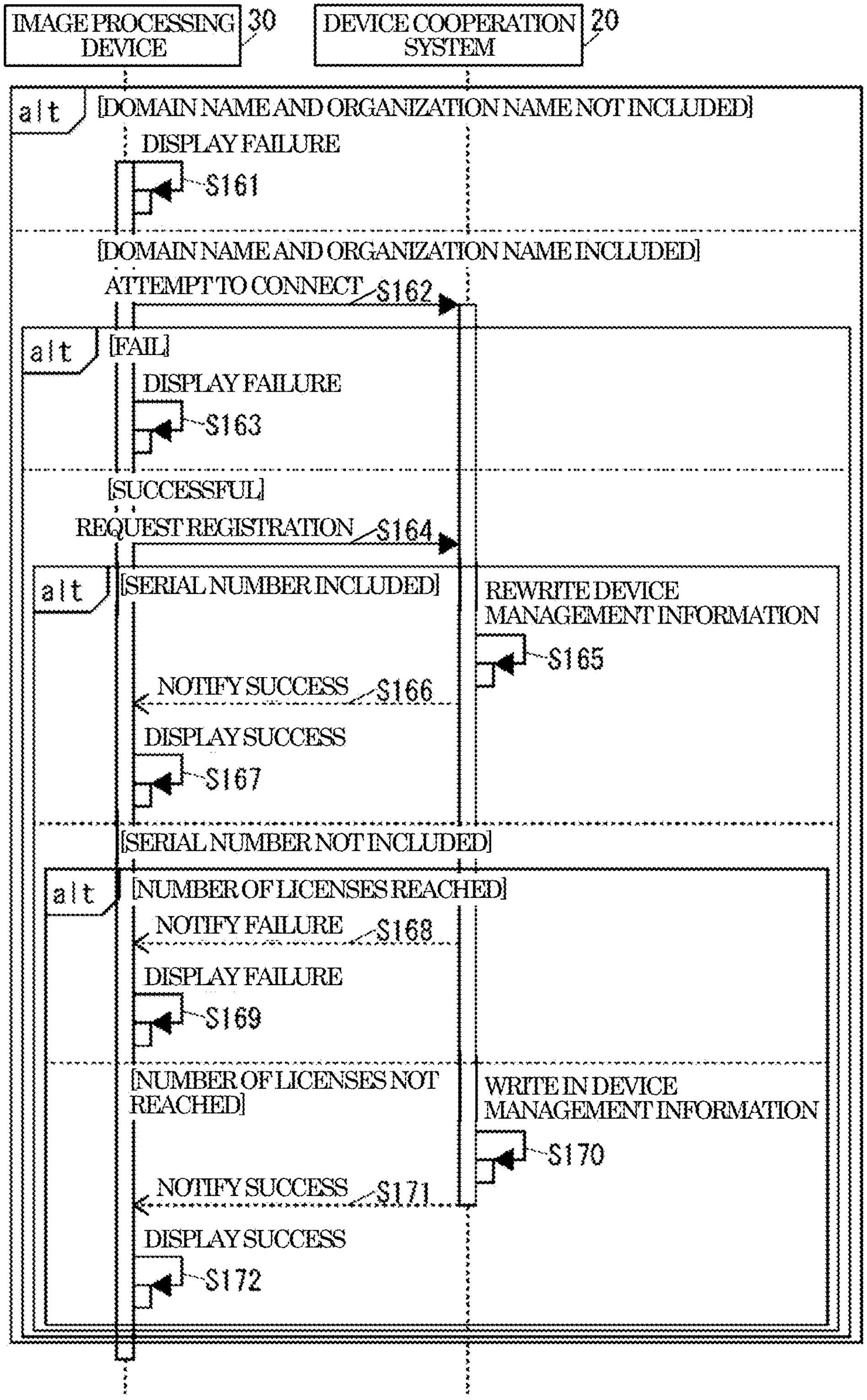
FIG. 14 is a sequence diagram of an operation of the image processing system shown in FIG. 1 when an image processing device is registered in the device cooperation system.

FIG. 14 is a sequence diagram of the operation of the image processing system 10 when the image processing device 30 is registered in the device cooperation system 20.

When the electronic device registration button 64 on the program administrator screen 60 is pressed and the domain name and the organization name are not included in the program setting information 37*c* as shown in FIG. 14, the system cooperation portion 38*a* of the image processing device 30 displays on the display portion 32 that the registration of the image processing device 30 to the device cooperation system 20 has failed because information necessary for connection to the device cooperation system 20 is insufficient (S161), and ends the operation shown in FIG. 14.

When the domain name and the organization name are included in the program setting information 37*c*, the system cooperation portion 38*a* attempts to connect to the device cooperation system 20 using the domain name and the organization name included in the program setting information 37*c* (S162). Here, when settings related to a proxy server are included in the program setting information 37*c*, the system cooperation portion 38*a* attempts to connect to the device cooperation system 20 also using the settings related to the proxy server included in the program setting information 37*c*. When the connection to the device cooperation system 20 is successful in the process of S162, the system cooperation portion 38*a* connects to an area of the device cooperation system 20 corresponding to the organization name designated in S162.

When the connection to the device cooperation system 20 fails in the process of S162, the system cooperation portion 38*a* displays on the display portion 32 that the registration of the image processing device 30 to the device cooperation system 20 has failed because the connection to the device cooperation system 20 has failed (S163), and ends the operation shown in FIG. 14.

When the connection to the device cooperation system 20 is successful in the process of S162, the system cooperation portion 38*a* requests the device cooperation system 20 to register the image processing device 30 (S164). The system cooperation portion 38*a* includes, in the request in S164, the serial number, the IP address, and the device administrator authentication information included in the electronic device information 37*b* and the "Admin PIN" included in the program setting information 37*c*.

When the request in S164 is received and the serial number included in the request in S164 is included in the device management information 24*d*, the device cooperation portion 25*a* of the device cooperation system 20 rewrites the IP address, the device administrator authentication information, and the "Admin PIN" value associated in the device management information 24*d* with the serial number included in the request in S164 with the IP address, the device administrator authentication information, and the "Admin PIN" value included in the request in S164 (S165).

When the process of S165 is completed, the device cooperation portion 25*a* notifies the image processing device 30 that the re-registration of the image processing device 30 was successful (S166).

Upon receipt of the notification in S166, the system cooperation portion 38*a* of the image processing device 30 displays on the display portion 32 that the re-registration of the image processing device 30 to the device cooperation system 20 was successful (S167), and ends the operation shown in FIG. 14.

When the request in S164 is received, the serial number included in the request in S164 is not included in the device management information 24*d*, and the number of image processing devices associated in the device management information 24*d* with the organization name corresponding to the area of the device cooperation system 20 to which the image processing device 30 is connected has reached the number of licenses associated with this organization in the organization management information 24*b*, the device cooperation portion 25*a* of the device cooperation system 20 notifies the image processing device 30 that the registration of the image processing device 30 has failed because the number of licenses has been reached (S168).

Upon receipt of the notification in S168, the system cooperation portion 38*a* of the image processing device 30 displays on the display portion 32 that the registration of the image processing device 30 to the device cooperation system 20 has failed because the number of licenses has been reached (S169), and ends the operation shown in FIG. 14.

When the request in S164 is received, the serial number included in the request in S164 is not included in the device management information 24*d*, and the number of image processing devices associated in the device management information 24*d* with the organization name corresponding to the area of the device cooperation system 20 to which the image processing device 30 is connected has not reached the number of licenses associated with this organization in the organization management information 24*b*, the device cooperation portion 25*a* of the device cooperation system 20 writes the serial number, the IP address, the device administrator authentication information, and the "Admin PIN" value included in the request in S164 in the device management information 24*d* in association with the organization name corresponding to the area of the device cooperation system 20 to which the image processing device 30 is connected (S170).

When the process of S170 is completed, the device cooperation portion 25*a* notifies the image processing device 30 that the new registration of the image processing device 30 was successful (S171).

Upon receipt of the notification in S171, the system cooperation portion 38*a* of the image processing device 30 displays on the display portion 32 that the new registration of the image processing device 30 to the device cooperation system 20 was successful (S172), and ends the operation shown in FIG. 14.

Next, an operation of the image processing device 30 when printing the setting reading code will be described.

Figure 15:
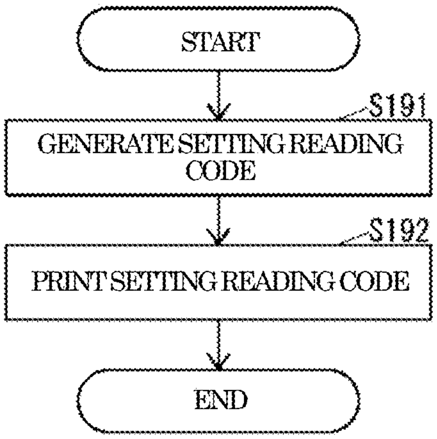
FIG. 15 is a flowchart of an operation of the image processing device shown in FIG. 6 when a setting reading code is printed.

The system cooperation portion 38*a* of the image processing device 30 executes the operation shown in FIG. 15 when the setting reading code printing button 62 on the program administrator screen 60 is pressed.

FIG. 15 is a flowchart of the operation of the image processing device 30 when printing the setting reading code.

As shown in FIG. 15, the system cooperation portion 38*a* generates a setting reading code in which the settings indicated in the program setting information 37*c* are embedded (S191). The setting reading code generated in S191 may be, for example, a two-dimensional code such as a QR code.

When the process of S191 is completed, the system cooperation portion 38*a* prints the setting reading code generated in S191 on a recording medium using the printer 33 (S192), and ends the operation shown in FIG. 15. Accordingly, the administrator of the image processing device 30 can obtain a recording medium with the setting reading code printed thereon.

Next, an operation of the image processing system 10 when the image processing device 40 reads settings from the setting reading code.

The user of the image processing device 40 can instruct the image processing device 40 to display the program administrator screen through the operation portion of the image processing device 40. When instructed to display the program administrator screen, the system cooperation portion of the image processing device 40 executes an operation similar to that shown in FIG. 9 to display the program administrator screen on the display portion of the image processing device 40.

Figure 16:
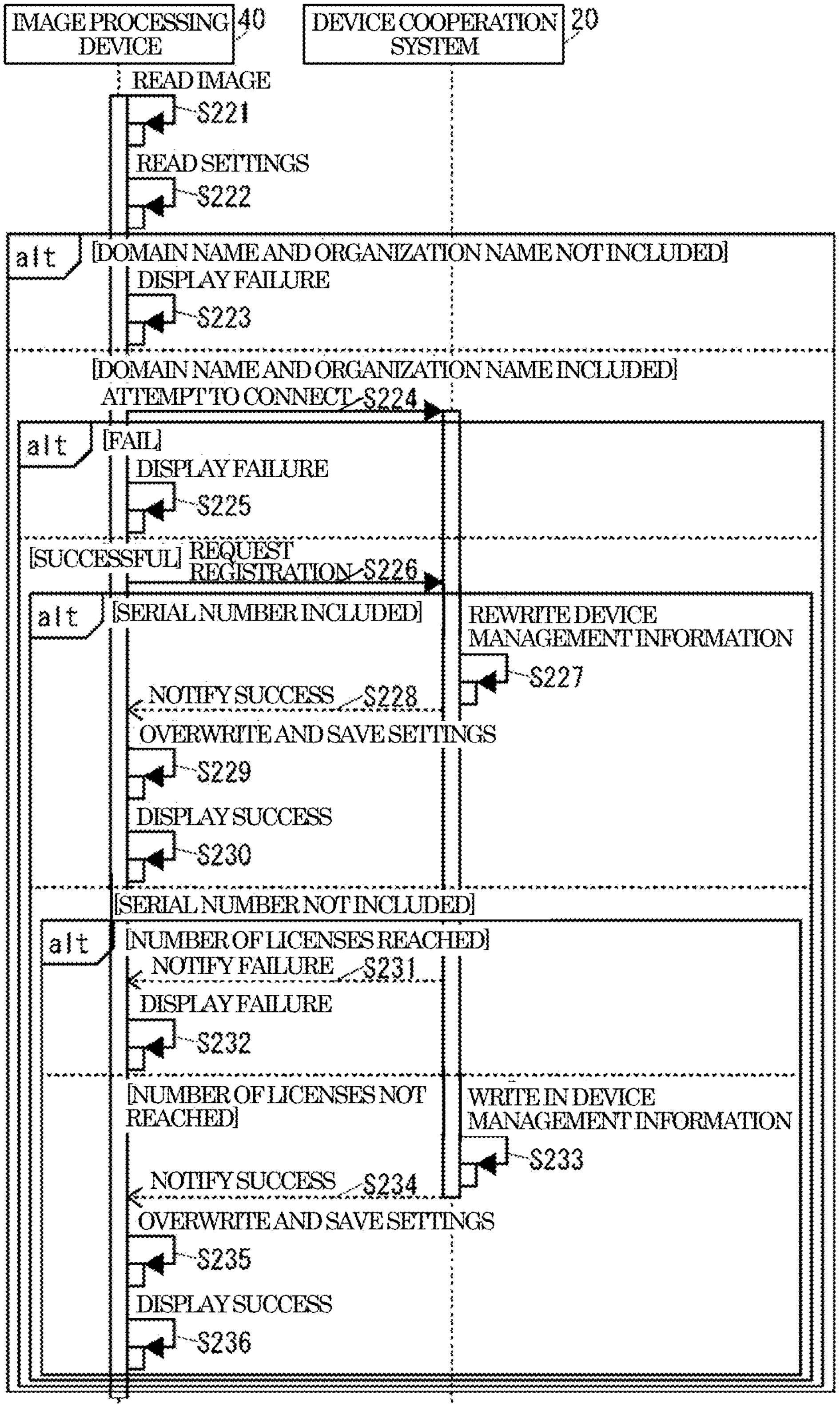
FIG. 16 is a sequence diagram of an operation of the image processing system shown in FIG. 1 when settings are read from the setting reading code.

FIG. 16 is a sequence diagram of an operation of the image processing system 10 when settings are read from the setting reading code.

The administrator of the image processing device 40 can set the recording medium with the setting reading code printed thereon in the scanner of the image processing device 40 and press the setting reading button on the program administrator screen of the image processing device 40. When the setting reading button on the program administrator screen of the image processing device 40 is pressed, the system cooperation portion of the image processing device 40 reads an image from the recording medium with the setting read code printed thereon, using the scanner of the image processing device 40, as shown in FIG. 16 (S221).

When the process of S221 is completed, the system cooperation portion of the image processing device 40 reads settings from the setting reading code in the image read in S221 (S222).

When the process of S222 is completed and the domain name and the organization name are not included in the settings read in S222, the system cooperation portion of the image processing device 40 displays on the display portion of the image processing device 40 that the registration of the image processing device 40 to the device cooperation system 20 and the setting for the system cooperation program of the image processing device 40 have failed due to the lack of information necessary for connection to the device cooperation system 20 (S223), and ends the operation shown in FIG. 16.

When the domain name and the organization name are included in the settings read in S222, the system cooperation portion of the image processing device 40 attempts to connect to the device cooperation system 20 using the domain name and the organization name included in the settings read in S222 (S224). Here, when settings related to a proxy server are included in the settings read in S222, the system cooperation portion of the image processing device 40 attempts to connect to the device cooperation system 20 also using the settings related to the proxy server included in the settings read in S222. When the connection to the device cooperation system 20 is successful in the process of S224, the system cooperation portion of the image processing device 40 connects to an area of the device cooperation system 20 corresponding to the organization name designated in S224.

When the connection to the device cooperation system 20 fails in the process of S224, the system cooperation portion of the image processing device 40 displays on the display portion of the image processing device 40 that the registration of the image processing device 40 to the device cooperation system 20 and the setting for the system cooperation program of the image processing device 40 have failed because the connection to the device cooperation system 20 has failed (S225), and ends the operation shown in FIG. 16.

When the connection to the device cooperation system 20 is successful in the process of S224, the system cooperation portion of the image processing device 40 requests the device cooperation system 20 to register the image processing device 40 (S226). The system cooperation portion of the image processing device 40 includes, in the request in S226, the serial number, the IP address, and the device administrator authentication information included in the electronic device information of the image processing device 40 and the "Admin PIN" value included in the settings read in S222.

When the request in S226 is received and the serial number included in the request included in S226 is included in the device management information 24*d*, the device cooperation portion 25*a* of the device cooperation system 20 rewrites the IP address, the device administrator authentication information, and the "Admin PIN" value associated in the device management information 24*d* with the serial number included in the request in S226 with the IP address, the device administrator authentication information, and the "Admin PIN" value included in the request in S226 (S227).

When the process of S227 is completed, the device cooperation portion 25*a* notifies the image processing device 40 that the re-registration of the image processing device 40 was successful (S228).

Upon receipt of the notification in S228, the system cooperation portion of the image processing device 40 overwrites and saves the settings read in S222 in the program setting information of the image processing device 40 (S229).

When the process of S229 is completed, the system cooperation portion of the image processing device 40 displays on the display portion of the image processing device 40 that the re-registration of the image processing device 40 to the device cooperation system 20 and the setting for the system cooperation program of the image processing device 40 were successful (S230), and ends the operation shown in FIG. 16.

When the request in S226 is received, the serial number included in the request in S226 is not included in the device management information 24*d*, and the number of image processing devices associated in the device management information 24*d* with the organization name corresponding to the area of the device cooperation system 20 to which the image processing device 40 is connected has reached the number of licenses associated with this organization in the organization management information 24*b*, the device cooperation portion 25*a* of the device cooperation system 20 notifies the image processing device 40 that the registration of the image processing device 40 has failed because the number of licenses has been reached (S231).

Upon receipt of the notification in S231, the system cooperation portion of the image processing device 40 displays on the display portion of the image processing device 40 that the registration of the image processing device 40 to the device cooperation system 20 and the setting for the system cooperation program of the image processing device 40 have failed because the number of licenses has been reached (S232), and ends the operation shown in FIG. 16.

When the request in S226 is received, the serial number included in the request in S226 is not included in the device management information 24*d*, and the number of image processing devices associated in the device management information 24*d* with the organization name corresponding to the area of the device cooperation system 20 to which the image processing device 40 is connected has not reached the number of licenses associated with this organization in the organization management information 24*b*, the device cooperation portion 25*a* of the device cooperation system 20 writes the serial number, the IP address, the device administrator authentication information, and the "Admin PIN" value included in the request in S226 in the device management information 24*d* in association with the organization name corresponding to the area of the device cooperation system 20 to which the image processing device 40 is connected (S233).

When the process of S233 is completed, the device cooperation portion 25*a* notifies the image processing device 40 that the new registration of the image processing device 40 was successful (S234).

Upon receipt of the notification in S234, the system cooperation portion of the image processing device 40 overwrites and saves the settings read in S222 in the program setting information of the image processing device 40 (S235).

When the process of S235 is completed, the system cooperation portion of the image processing device 40 displays on the display portion of the image processing device 40 that the new registration of the image processing device 40 to the device cooperation system 20 and the setting for the system cooperation program of the image processing device 40 were successful (S236), and ends the operation shown in FIG. 16.

Described above is an operation of the image processing system 10 when the image processing device 40 reads settings from the setting reading code. However, the same applies to the operation of the image processing system 10 when image processing devices other than the image processing device 40 read settings from the setting reading code.

In the above-described case, the image processing device 30 is registered in the device cooperation system 20 by the electronic device registration button 64 on the program administrator screen 60 being pressed. However, similarly to the image processing device 40, the image processing device 30 may be registered in the device cooperation system 20 by the setting reading button 63 on the program administrator screen 60 being pressed.

As described above, when an image processing device requests the device cooperation system 20 to register the image processing device in S226, if the device cooperation system 20 has already registered or newly registered the image processing device, the image processing system 10 reflects the settings the image processing device read from the code to the image processing device (S229 and S235), and if the device cooperation system 20 has neither already registered nor newly registered the image processing device, the image processing system 10 does not reflect the settings the image processing device read from the code to the image processing device (S232), thereby limiting the reflection of settings.

The image processing system 10 can reflect the settings the image processing device read from the code to the image processing device within the limits of the number of licenses allowed.

Since the image processing device reads the settings for the image processing device from the code, the image processing system 10 can facilitate execution of the setting for image processing devices even when reflecting the settings for image processing devices in many image processing devices.

Second Embodiment

First, a configuration of an image processing system as a device setting system according to a second embodiment of the present disclosure will be described.

Among the constituent elements of the image processing system according to the present embodiment, the same constituent elements as those of the image processing system 10 according to the first embodiment are denoted by the same reference numerals as those of the constituent elements of the image processing system 10, and detailed descriptions thereof will be omitted.

Figure 17:
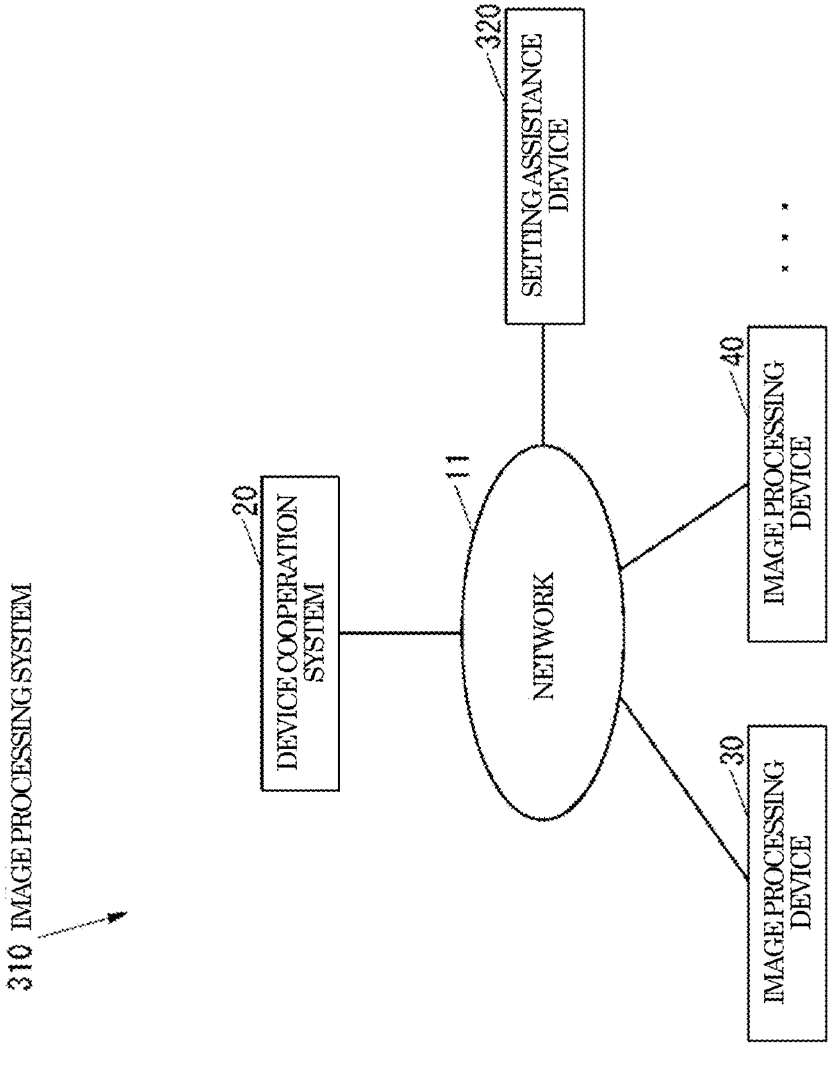
FIG. 17 is a block diagram of an image processing system according to a second embodiment of the present disclosure.

FIG. 17 is a block diagram of an image processing system 310 according to the present embodiment.

As shown in FIG. 17, the image processing system 310 includes a device cooperation system 20, an image processing device 30, an image processing device 40, and an electronic device (hereinafter referred to as a "setting assistance device") 320 that assists execution of setting for a system cooperation program of an image processing device.

The setting assistance device 320 may be configured by a mobile device such as a smartphone or a tablet, or may be configured by a computer such as a PC.

The image processing device and the setting assistance device 320 can communicate with each other via the network 11.

Figure 18:
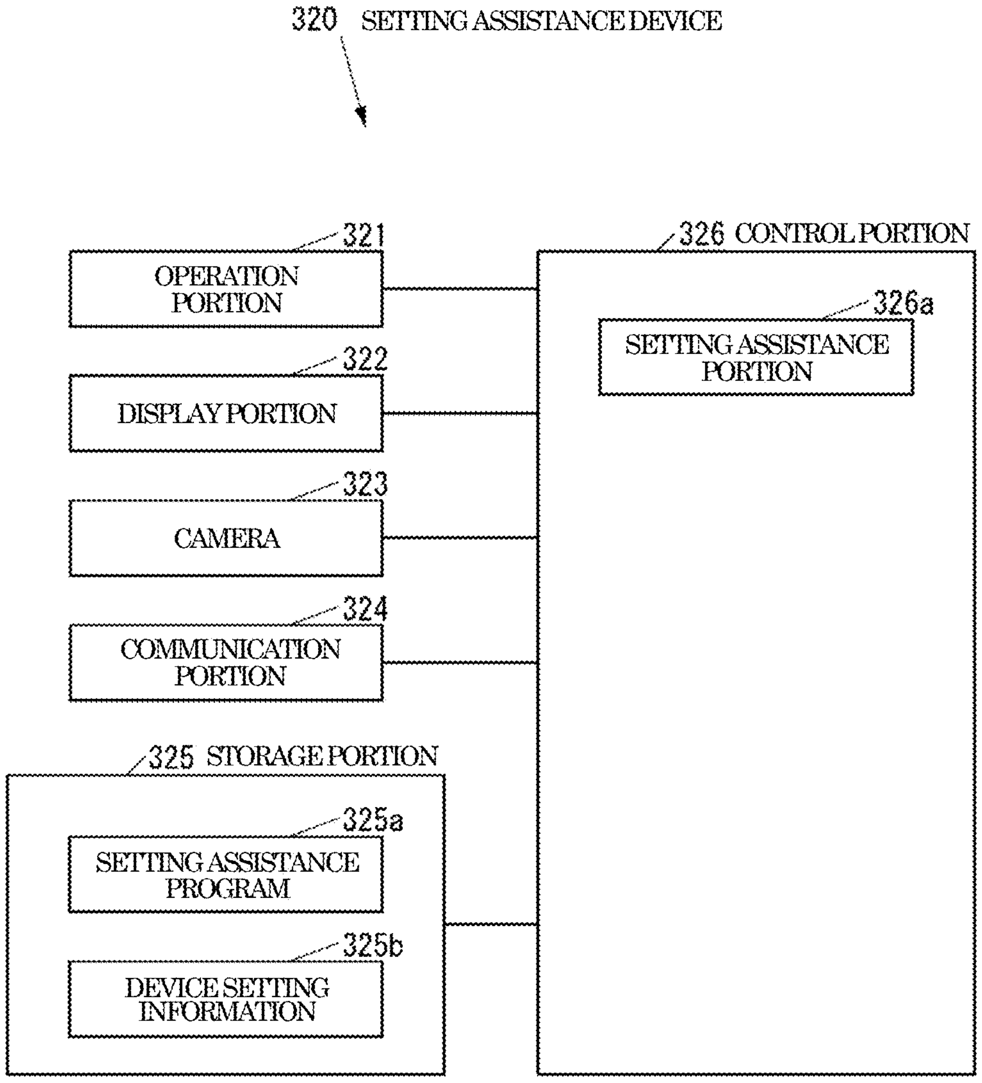
FIG. 18 is a block diagram of an example of a setting assistance device shown in FIG. 17 when configured by a mobile device.

FIG. 18 is a block diagram of an example of the setting assistance device 320 when configured by a mobile device.

As shown in FIG. 18, the setting assistance device 320 includes: an operation portion 321, which is an operation device such as buttons, through which various operations are input; a display portion 322, which is a display device such as an LCD, which displays various types of information; camera 323; a communication portion 324, which is a communication device which communicates with an external device via a network such as a LAN or the Internet, or directly by wire or wirelessly without using a network; a storage portion 325, which is a non-volatile storage device such as a semiconductor memory or an HDD, which stores various types of information; and a control portion 326 which controls the entire setting assistance device 320.

The storage portion 325 can store a setting assistance program 325*a* for assisting the execution of the setting for the system cooperation program of the image processing device. For example, the setting assistance program 325*a* may be installed in the setting assistance device 320 at the manufacturing stage of the setting assistance device 320, may be additionally installed in the setting assistance device 320 from an external storage medium, such as a USB memory, or may be additionally installed in the setting assistance device 320 from the network.

The storage portion 325 can store device setting information 325*b* indicating the settings for the system cooperation program of the image processing device. The configuration of the device setting information 325*b* is the same as that of the program setting information 37*c* (see FIG. 8).

The control portion 326 includes, for example, a CPU, a ROM, which stores programs and various types of data, and a RAM as a memory used as a work area of the CPU of the control portion 326. The CPU of the control portion 326 executes programs stored in the storage portion 325 or the ROM of the control portion 326.

The control portion 326 executes the setting assistance program 325*a* to implement a setting assistance portion 326*a* that assists the execution of the setting for the system cooperation program of the image processing device.

Next, an operation of the image processing system 310 will be described.

First, an operation of the setting assistance device 320 when settings for the system cooperation program of the image processing device are input will be described.

Figure 19:
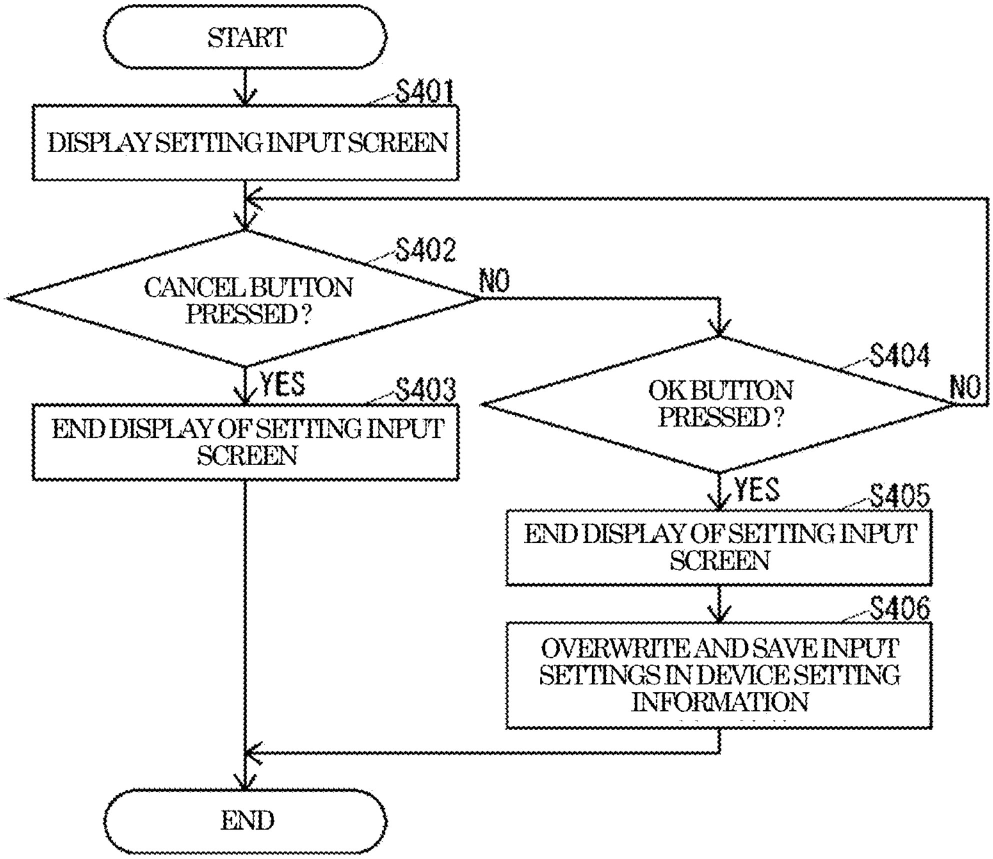
FIG. 19 is a flowchart of an operation of the setting assistance device shown in FIG. 18 when settings for the system cooperation program of the image processing device are input.

When an instruction for input of the settings for the system cooperation program of the image processing device is received through the operation portion 321, the setting assistance portion 326*a* of the setting assistance device 320 executes the operation shown in FIG. 19.

FIG. 19 is a flowchart of the operation of the setting assistance device 320 when settings for the system cooperation program of the image processing device are input.

As shown in FIG. 19, the setting assistance portion 326*a* displays on the display portion 322 a setting input screen for inputting settings (S401). Here, since the setting input screen displayed in S401 is the same as the setting input screen 70 (see FIG. 13), a detailed description thereof will be omitted.

When the process of S401 is completed, the system cooperation portion 38*a* determines whether or not the cancel button has been pressed (S402).

When the system cooperation portion 38*a* determines in S402 that the cancel button on the setting input screen has been pressed, the system cooperation portion 38*a* ends the display of the setting input screen on the display portion 322 (S403), and ends the operation shown in FIG. 19.

When the system cooperation portion 38*a* determines in S402 that the cancel button has not been pressed, the system cooperation portion 38*a* determines whether or not the OK button on the setting input screen has been pressed (S404).

When the system cooperation portion 38*a* determines in S404 that the OK button on the setting input screen has not been pressed, the system cooperation portion 38*a* executes the process of S402.

When the system cooperation portion 38*a* determines in S404 that the OK button on the setting input screen has been pressed, the system cooperation portion 38*a* ends the display of the setting input screen on the display portion 322 (S405).

When the process of S405 is completed, the system cooperation portion 38*a* overwrites and saves the settings input on the setting input screen when the OK button on the setting input screen is pressed in the device setting information 325*b* (S406), and ends the operation shown in FIG. 19.

Next, an operation of the image processing device 30 when displaying on the display portion 32 a code (hereinafter referred to as a "setting transmission code") for the setting assistance device 320 to transmit the settings for the system cooperation program of the image processing device to the image processing device 30 will be described.

Figure 20:
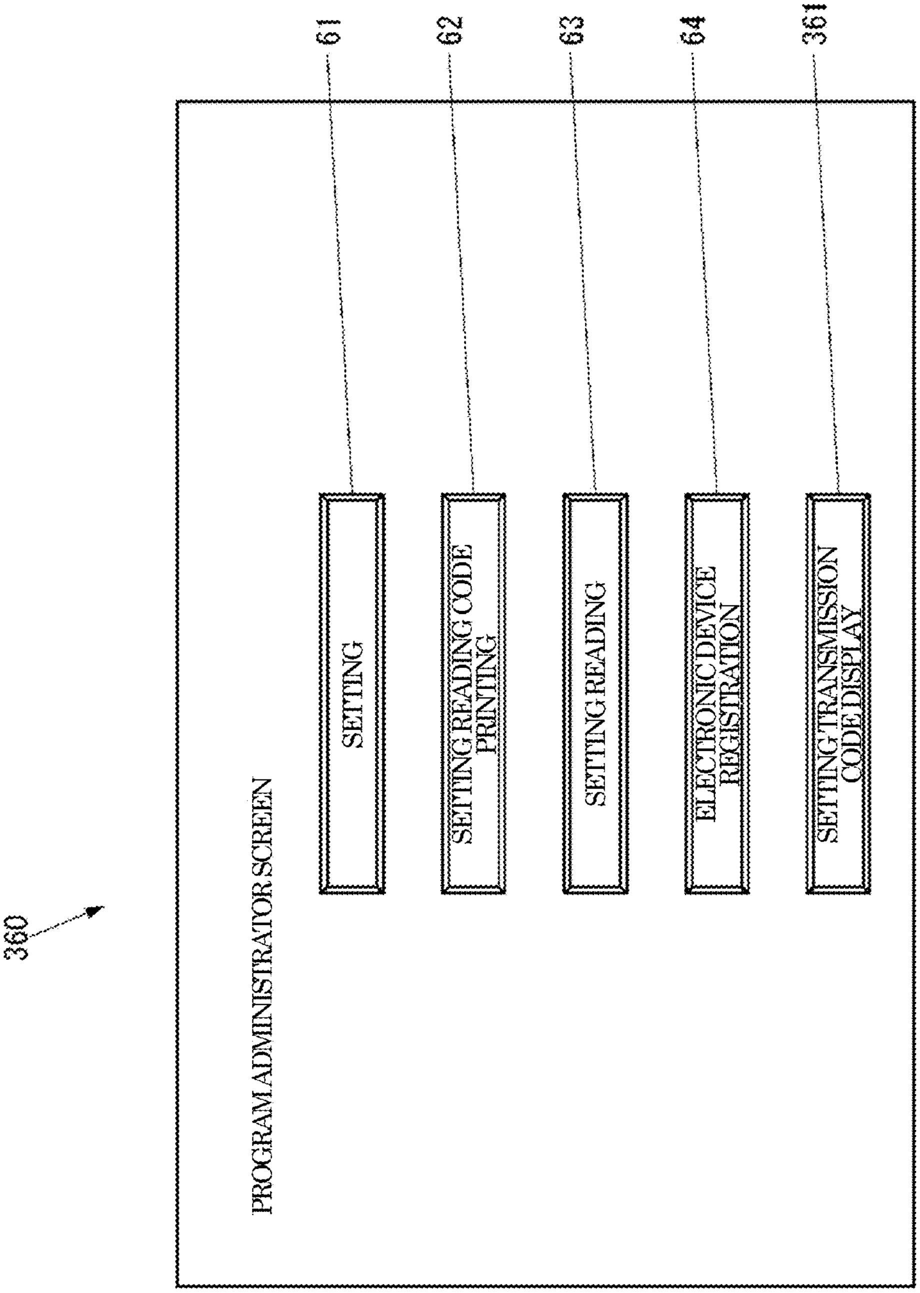
FIG. 20 shows an example of a program administrator screen displayed on a display portion of the image processing device shown in FIG. 17.

The system cooperation portion 38*a* of the image processing device 30 according to the present embodiment displays on the display portion 32 a program administrator screen 360 shown in FIG. 20 instead of the program administrator screen 60 (see FIG. 11).

FIG. 20 shows an example of the program administrator screen 360 displayed on the display portion 32 of the image processing device 30 according to the present embodiment.

The program administrator screen 360 shown in FIG. 20 has the same configuration as the program administrator screen 60 provided with a setting transmission code display button 361 for displaying the setting transmission code.

Figure 21:
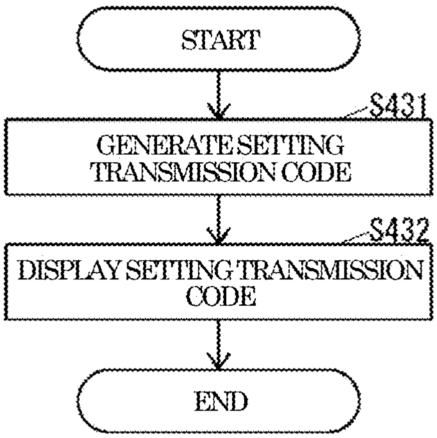
FIG. 21 is a flowchart of an operation of the image processing device shown in FIG. 17 when a setting transmission code is displayed.

The system cooperation portion 38*a* of the image processing device 30 executes the operation shown in FIG. 21 when the setting transmission code display button 361 on the program administrator screen 360 is pressed.

FIG. 21 is a flowchart of an operation of the image processing device 30 when the setting transmission code is displayed.

As shown in FIG. 21, the system cooperation portion 38*a* generates a setting transmission code in which the serial number and IP address indicated in the electronic device information 37*b* are embedded (S431). The setting transmission code generated in S431 may be, for example, a two-dimensional code such as a QR code. The setting transmission code generated in S431 only needs to have information necessary for communication with the image processing device 30 embedded therein.

When the process of S431 is completed, the system cooperation portion 38*a* displays on the display portion 32 the setting transmission code generated in S431 (S432), and ends the operation shown in FIG. 21.

Next, an operation of the image processing system 310 when the image processing device 30 is registered in the device cooperation system 20 will be described.

Figure 22:
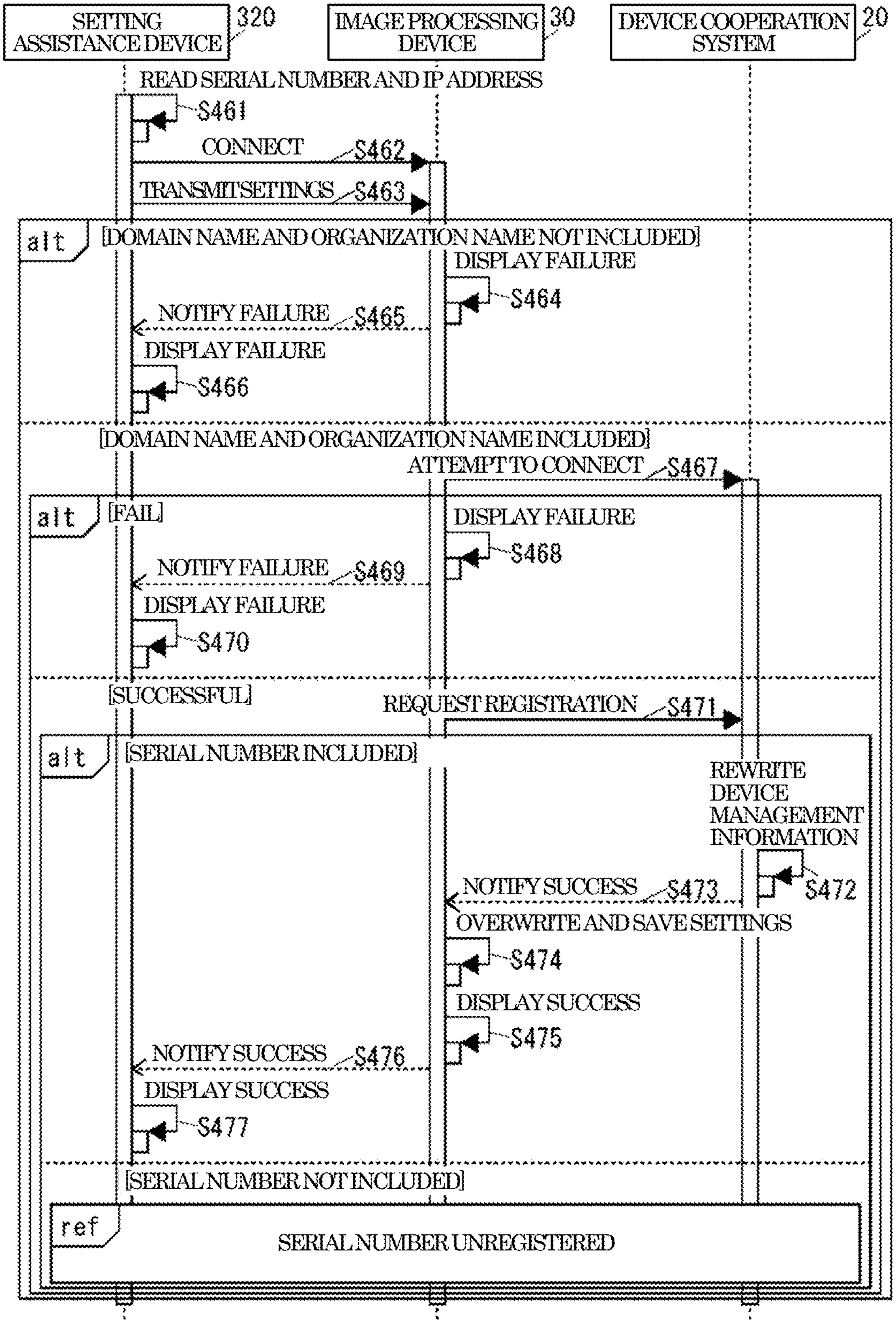
FIG. 22 is a sequence diagram of the operation of the image processing system shown in FIG. 17 when an image processing device is registered in the device cooperation system.
Figure 23:
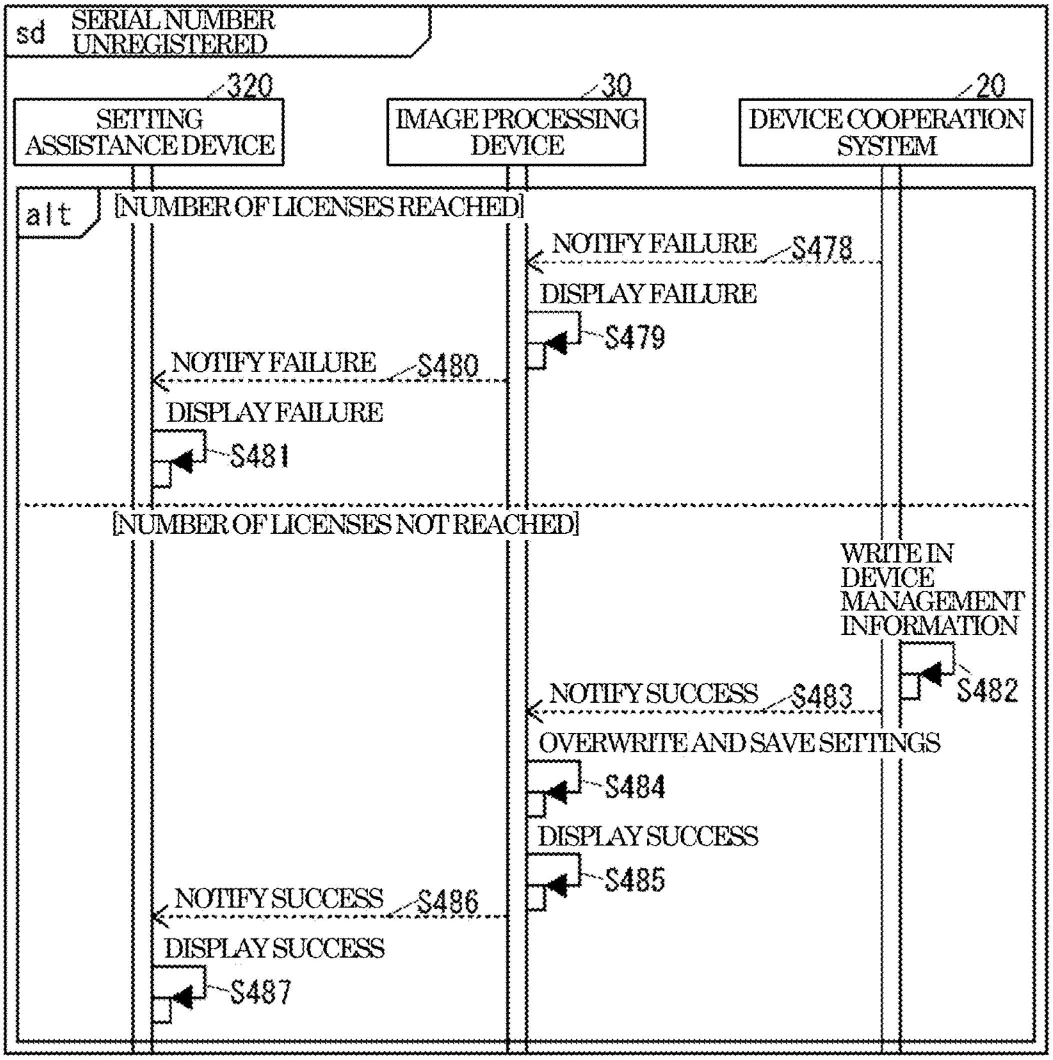
FIG. 23 is a sequence diagram of "serial number unregistered" in FIG. 22.

FIG. 22 is a sequence diagram of the operation of the image processing system 310 when the image processing device 30 is registered in the device cooperation system 20. FIG. 23 is a sequence diagram of "serial number unregistered" in FIG. 22.

The user of the setting assistance device 320 can pick up an image of the setting transmission code displayed on the display portion 32 of the image processing device 30 with a camera 323. When the image of the setting transmission code is picked up by the camera 323, the setting assistance portion 326*a* of the setting assistance device 320 reads the serial number and the IP address from the setting transmission code whose image has been picked up by the camera 323 as shown in FIG. 22 and FIG. 23 (S461).

When the process of S461 is completed, the setting assistance portion 326*a* connects to the image processing device 30 using the serial number and the IP address read in S461 (S462), and transmits the settings indicated in the device setting information 325*b* to the image processing device 30 (S463).

When the process of S463 is completed and the domain name and the organization name are not included in the settings transmitted from the setting assistance device 320 in S463, the system cooperation portion 38*a* of the image processing device 30 displays on the display portion 32 that the registration of the image processing device 30 in the device cooperation system 20 and the setting for the system cooperation program 37*a* have failed because the information necessary for the connection to the device cooperation system 20 is insufficient (S464).

When the process of S464 is completed, the system cooperation portion 38*a* notifies the setting assistance device 320 that the registration of the image processing device 30 in the device cooperation system 20 and the setting for the system cooperation program 37*a* have failed because the information necessary for the connection to the device cooperation system 20 is insufficient (S465).

When the process of S465 is completed, the setting assistance portion 326*a* of the setting assistance device 320 displays on the display portion 322 that the registration of the image processing device 30 in the device cooperation system 20 and the setting for the system cooperation program 37*a* have failed because the information necessary for the connection to the device cooperation system 20 is insufficient, which was notified from the image processing device 30 in S465, (S466), and ends the operations shown in FIG. 22 and FIG. 23.

When the domain name and the organization name are included in the settings transmitted from the setting assistance device 320 in S463, the system cooperation portion 38*a* of the image processing device 30 attempts to connect to the device cooperation system 20 using the domain name and the organization name included in the settings transmitted from the setting assistance device 320 in S463 (S467). When settings related to a proxy server are included in the settings transmitted from the setting assistance device 320 in S463, the system cooperation portion 38*a* of the image processing device 30 attempts to connect to the device cooperation system 20 also using the settings related to the proxy server included in the settings transmitted from the setting assistance device 320 in S463. When the connection to the device cooperation system 20 is successful in the process of S467, the system cooperation portion 38*a* of the image processing device 30 connects to an area of the device cooperation system 20 corresponding to the organization name designated in S467.

When the connection to the device cooperation system 20 fails in the process of S467, the system cooperation portion 38*a* of the image processing device 30 displays on the display portion 32 that the registration of the image processing device 30 to the device cooperation system 20 and the setting for the system cooperation program 37*a* of the image processing device 30 have failed because the connection to the device cooperation system 20 has failed (S468).

When the process of S468 is completed, the system cooperation portion 38*a* notifies the setting assistance device 320 that the registration of the image processing device 30 to the device cooperation system 20 and the setting for the system cooperation program 37*a* of the image processing device 30 have failed because the connection to the device cooperation system 20 has failed (S469).

When the process of S469 is completed, the setting assistance portion 326*a* of the setting assistance device 320 displays on the display portion 322 that the registration of the image processing device 30 to the device cooperation system 20 and the setting for the system cooperation program 37*a* of the image processing device 30 have failed because the connection to the device cooperation system 20 has failed, which was notified from the image processing device 30 in S469, (S470), and ends the operations shown in FIG. 22 and FIG. 23.

When the connection to the device cooperation system 20 is successful in the process of S467, the system cooperation portion 38*a* of the image processing device 30 requests the device cooperation system 20 to register the image processing device 30 (S471). The system cooperation portion 38*a* of the image processing device 30 includes, in the request in S471, the serial number, the IP address, and the device administrator authentication information included in the electronic device information 37*b* and the "Admin PIN" value included in the settings transmitted from the setting assistance device 320 in S463.

When the request in S471 is received and the serial number included in the request included in S471 is included in the device management information 24*d*, the device cooperation portion 25*a* of the device cooperation system 20 rewrites the IP address, the device administrator authentication information, and the "Admin PIN" value associated in the device management information 24*d* with the serial number included in the request in S471 with the IP address, the device administrator authentication information, and the "Admin PIN" value included in the request in S471 (S472).

When the process of S472 is completed, the device cooperation portion 25*a* notifies the image processing device 30 that the re-registration of the image processing device 30 was successful (S473).

Upon receipt of the notification in S473, the system cooperation portion 38*a* of the image processing device 30 overwrites and saves the settings transmitted from the setting assistance device 320 in S463 in the program setting information 37*c* (S474).

When the process of S474 is completed, the system cooperation portion 38*a* displays on the display portion 32 that the re-registration of the image processing device 30 to the device cooperation system 20 and the setting for the system cooperation program 37*a* of the image processing device 30 were successful (S475).

When the process of S475 is completed, the system cooperation portion 38*a* notifies the setting assistance device 320 that the re-registration of the image processing device 30 to the device cooperation system 20 and the setting for the system cooperation program 37*a* of the image processing device 30 were successful (S476).

When the process of S476 is completed, the setting assistance portion 326*a* of the setting assistance device 320 displays on the display portion 322 that the re-registration of the image processing device 30 to the device cooperation system 20 and the setting for the system cooperation program 37*a* of the image processing device 30 were successful, which was notified from the image processing device 30 in S476, (S477), and ends the operations shown in FIG. 22 and FIG. 23.

When the request in S471 is received, the serial number included in the request in S471 is not included in the device management information 24*d*, and the number of image processing devices associated in the device management information 24*d* with the organization name corresponding to the area of the device cooperation system 20 to which the image processing device 30 is connected has reached the number of licenses associated with this organization in the organization management information 24*b*, the device cooperation portion 25*a* of the device cooperation system 20 notifies the image processing device 30 that the registration of the image processing device 30 has failed because the number of licenses has been reached (S478).

Upon receipt of the notification in S478, the system cooperation portion 38*a* of the image processing device 30 displays on the display portion 32 that the registration of the image processing device 30 to the device cooperation system 20 and the setting for the system cooperation program 37*a* of the image processing device 30 have failed because the number of licenses has been reached (S479).

When the process of S479 is completed, the system cooperation portion 38*a* notifies the setting assistance device 320 that the registration of the image processing device 30 to the device cooperation system 20 and the setting for the system cooperation program 37*a* of the image processing device 30 have failed because the number of licenses has been reached (S480).

When the process of S480 is completed, the setting assistance portion 326*a* of the setting assistance device 320 displays on the display portion 322 that the registration of the image processing device 30 to the device cooperation system 20 and the setting for the system cooperation program 37*a* of the image processing device 30 have failed because the number of licenses has been reached, which was notified by the image processing device 30 in S480, (S481), and ends the operations shown in FIG. 22 and FIG. 23.

When the request in S471 is received, the serial number included in the request in S471 is not included in the device management information 24*d*, and the number of image processing devices associated in the device management information 24*d* with the organization name corresponding to the area of the device cooperation system 20 to which the image processing device 30 is connected has not reached the number of licenses associated with this organization in the organization management information 24*b*, the device cooperation portion 25*a* of the device cooperation system 20 writes the serial number, the IP address, the device administrator authentication information, and the "Admin PIN" value included in the request in S471 in the device management information 24*d* in association with the organization name corresponding to the area of the device cooperation system 20 to which the image processing device 30 is connected (S482).

When the process of S482 is completed, the device cooperation portion 25*a* notifies the image processing device 30 that the new registration of the image processing device 30 was successful (S483).

Upon receipt of the notification in S483, the system cooperation portion 38*a* of the image processing device 30 overwrites and saves the settings transmitted from the setting assistance device 320 in S463 in the program setting information 37*c* of the image processing device 30 (S484).

When the process of S484 is completed, the system cooperation portion 38*a* of the image processing device 30 displays on the display portion 32 that the new registration of the image processing device 30 to the device cooperation system 20 and the setting for the system cooperation program 37*a* of the image processing device 30 were successful (S485).

When the process of S485 is completed, the system cooperation portion 38*a* notifies the setting assistance device 320 that the new registration of the image processing device 30 to the device cooperation system 20 and the setting for the system cooperation program 37*a* of the image processing device 30 were successful (S486).

When the process of S486 is completed, the setting assistance portion 326*a* of the setting assistance device 320 displays on the display portion 322 that the new registration of the image processing device 30 to the device cooperation system 20 and the setting for the system cooperation program 37*a* of the image processing device 30 were successful, which was notified from the image processing device 30 in S486, (S487), and ends the operations shown in FIG. 22 and FIG. 23.

Described above is an operation of the image processing system 310 when the setting for the system cooperation program 37*a* of the image processing device 30 is executed. The image processing system 310 operates in the same manner when the setting for the system cooperation program of an image processing device other than the image processing device 30, such as the image processing device 40, is executed.

As described above, when an image processing device requests the device cooperation system 20 to register the image processing device in S471, if the device cooperation system 20 has already registered the image processing device or has newly registered the image processing device, the image processing system 310 reflects the settings transmitted from the setting assistance device 320 in S463 to the image processing device (S474 and S484), and if the device cooperation system 20 has neither registered nor newly registered the image processing device, the image processing system 310 does not reflect the settings transmitted from the setting assistance device in S463 to the image processing device (S479), thereby limiting the reflection of settings.

The image processing system 310 can reflect the settings for image processing devices to image processing devices within the limits of the number of licenses allowed.

Since the image processing system 310 uses a code to execute the setting for image processing devices, it can facilitate the execution of the setting for image processing devices even when reflecting the settings for image processing devices in many image processing devices.

Third Embodiment

First, a configuration of an image processing system as a device setting system according to a third embodiment of the present disclosure will be described.

The image processing system according to the third embodiment of the present disclosure has the same configuration as the image processing system 310 according to the second embodiment. Among the constituent elements of the image processing system according to the present embodiment, the same constituent elements as those of the image processing system 310 according to the second embodiment are denoted by the same reference numerals as those of the constituent elements of the image processing system 310, and detailed descriptions thereof will be omitted.

The device cooperation system 20, the image processing device, and the setting assistance device 320 can communicate with each other via the network 11.

Next, an operation of the image processing system according to the present embodiment will be described.

Similar to the second embodiment, the setting assistance device 320 can receive an input of settings for the system cooperation program of image processing devices.

An operation of the image processing device 30 when the setting assistance device 320 displays on the display portion 32 a code (hereinafter, referred to as a "device registration code") for registering the image processing device 30 in the device cooperation system 20 will be described.

Figure 24:
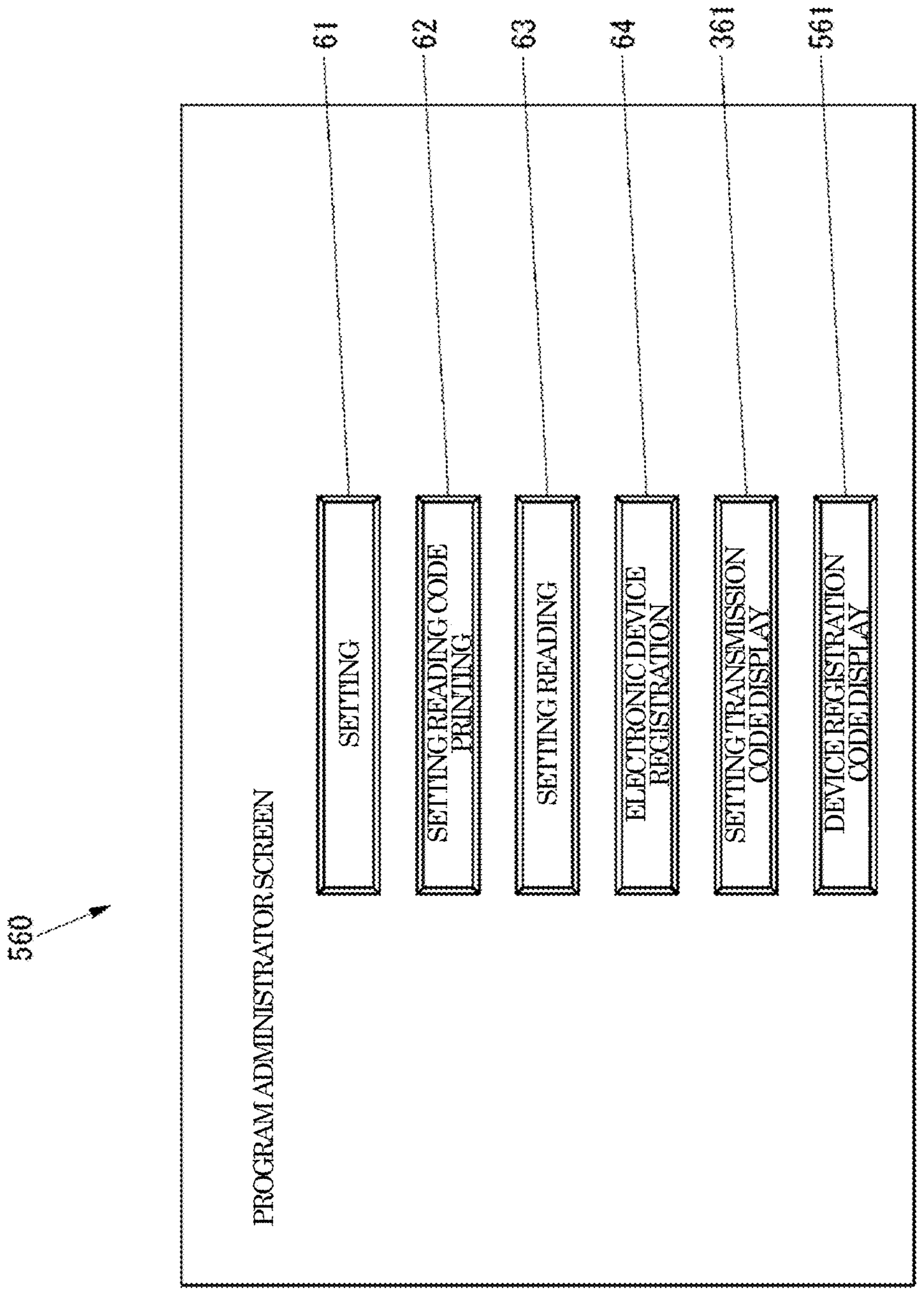
FIG. 24 shows an example of a program administrator screen displayed on a display portion of an image processing device according to a third embodiment of the present disclosure.

The system cooperation portion 38*a* of the image processing device 30 according to the present embodiment displays on the display portion 32 a program administrator screen 560 shown in FIG. 24 instead of the program administrator screen 360 (see FIG. 20).

FIG. 24 shows an example of the program administrator screen 560 displayed on the display portion 32 of the image processing device 30 according to the present embodiment.

The program administrator screen 560 shown in FIG. 24 has the same configuration as the program administrator screen 360 provided with a device registration code display button 561 for displaying the device registration code.

Figure 25:
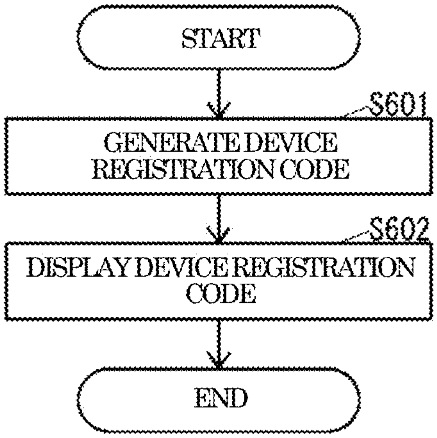
FIG. 25 is a flowchart of an operation of the image processing device according to the third embodiment of the present disclosure when a device registration code is displayed.

The system cooperation portion 38*a* of the image processing device 30 executes the operation shown in FIG. 25 when the device registration code display button 561 on the program administrator screen 560 is pressed.

FIG. 25 is a flowchart of an operation of the image processing device 30 when displaying the device registration code.

As shown in FIG. 25, the system cooperation portion 38*a* generates a device registration code in which information necessary for the device cooperation system 20 to register the image processing device 30, that is, the serial number, the IP address, and the device administrator authentication information included in the electronic device information 37*b*, and the "Admin PIN" value included in the program setting information 37*c* are embedded (S601). The device registration code generated in S601 may be, for example, a two-dimensional code such as a QR code.

When the process of S601 is completed, the system cooperation portion 38*a* displays the device registration code generated in S601 on the display portion 32 (S602), and ends the operation shown in FIG. 25.

Next, an operation of the image processing system according to the present embodiment when the image processing device 30 is registered in the device cooperation system 20 will be described.

Figure 26:
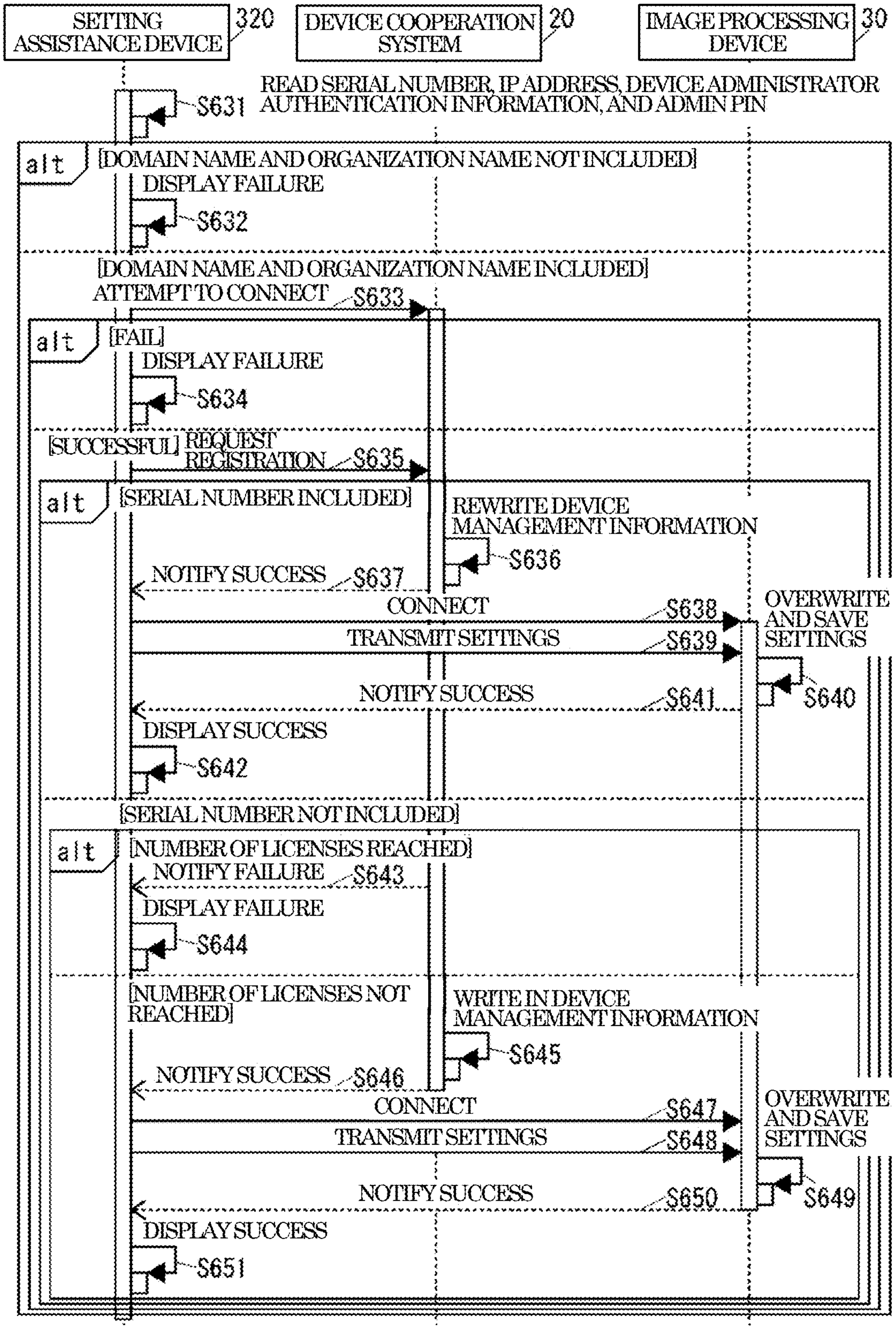
FIG. 26 is a sequence diagram of an operation of an image processing system according to the third embodiment of the present disclosure when an image processing device is registered in the device cooperation system.

FIG. 26 is a sequence diagram of the operation of the image processing system according to the present embodiment when the image processing device 30 is registered in the device cooperation system 20.

The user of the setting assistance device 320 can pick up an image of the device registration code displayed on the display portion 32 of the image processing device 30 with the camera 323. When the image of the device registration code is picked up by the camera 323, the setting assistance portion 326*a* of the setting assistance device 320 reads the serial number, the IP address, the device administrator authentication information, and the "Admin PIN" value from the device registration code as shown in FIG. 26 (S631).

When the process of S631 is completed and the domain name and the organization name are not included in the settings indicated in the device setting information 325*b*, the setting assistance portion 326*a* displays on the display portion 322 that the registration of the image processing device 30 to the device cooperation system 20 and the setting for the system cooperation program 37*a* have failed because information necessary for connection to the device cooperation system 20 is insufficient (S632), and ends the operation shown in FIG. 26.

When the domain name and the organization name are included in the device setting information 325*b*, the setting assistance portion 326*a* attempts to connect to the device cooperation system 20 using the domain name and the organization name included in the settings indicated in the device setting information 325*b* (S633). Here, when settings related to a proxy server are included in the settings indicated in the device setting information 325*b*, the setting assistance portion 326*a* attempts to connect to the device cooperation system 20 also using the settings related to the proxy server indicated in the device setting information 325*b*. When the connection to the device cooperation system 20 is successful in the process of S633, the setting assistance portion 326*a* connects to an area of the device cooperation system 20 corresponding to the organization name designated in S633.

When the connection to the device cooperation system 20 fails in the process of S633, the setting assistance portion 326*a* displays on the display portion 322 that the registration of the image processing device 30 to the device cooperation system 20 and the setting for the system cooperation program 37*a* of the image processing device 30 have failed because the connection to the device cooperation system 20 has failed (S634), and ends the operation shown in FIG. 26.

When the connection to the device cooperation system 20 is successful in the process of S633, the setting assistance portion 326*a* requests the device cooperation system 20 to register the image processing device 30 (S635). The setting assistance portion 326*a* includes, in the request in S635, the serial number, the IP address, the device administrator authentication information, and the "Admin PIN" value read in S631.

When the request in S635 is received and the serial number included in the request included in S635 is included in the device management information 24*d*, the device cooperation portion 25*a* of the device cooperation system 20 rewrites the IP address, the device administrator authentication information, and the "Admin PIN" value associated in the device management information 24*d* with the serial number included in the request in S635 with the IP address, the device administrator authentication information, and the "Admin PIN" value included in the request in S635 (S636).

When the process of S636 is completed, the device cooperation portion 25*a* notifies the setting assistance device 320 that the re-registration of the image processing device 30 was successful (S637).

Upon receipt of the notification in S637, the setting assistance portion 326*a* of the setting assistance device 320 connects to the image processing device 30 using the serial number and the IP address read in S631 (S638), and transmits the settings indicated in the device setting information 325*b* to the image processing device 30 (S639).

When the process of S639 is completed, the system cooperation portion 38*a* of the image processing device 30 overwrites and saves the settings transmitted from the setting assistance device 320 in S639 in the program setting information 37*c* (S640).

When the process of S640 is completed, the system cooperation portion 38*a* notifies the setting assistance device 320 that the setting for the system cooperation program 37*a* of the image processing device 30 was successful (S641).

When the process of S641 is completed, the setting assistance portion 326*a* of the setting assistance device 320 displays on the display portion 322 that the re-registration of the image processing device 30 to the device cooperation system 20 and the setting for the system cooperation program 37*a* of the image processing device 30 were successful (S642), and ends the operation shown in FIG. 26.

When the request in S635 is received, the serial number included in the request in S635 is not included in the device management information 24*d*, and the number of image processing devices associated in the device management information 24*d* with the organization name corresponding to the area of the device cooperation system 20 to which the setting assistance device 320 is connected has reached the number of licenses associated with this organization in the organization management information 24*b*, the device cooperation portion 25*a* of the device cooperation system 20 notifies the setting assistance device 320 that the registration of the image processing device 30 has failed because the number of licenses has been reached (S643).

Upon receipt of the notification in S643, the setting assistance portion 326*a* of the setting assistance device 320 displays on the display portion 322 that the registration of the image processing device 30 to the device cooperation system 20 and the setting for the system cooperation program 37*a* of the image processing device 30 have failed because the number of licenses has been reached (S644), and ends the operation shown in FIG. 26.

When the request in S635 is received, the serial number included in the request in S635 is not included in the device management information 24*d*, and the number of image processing devices associated in the device management information 24*d* with the organization name corresponding to the area of the device cooperation system 20 to which the setting assistance device 320 is connected has not reached the number of licenses associated with this organization in the organization management information 24*b*, the device cooperation portion 25*a* of the device cooperation system 20 writes the serial number, the IP address, the device administrator authentication information, and the "Admin PIN" value included in the request in S635 in the device management information 24*d* in association with the organization name corresponding to the area of the device cooperation system 20 to which the setting assistance device 320 is connected (S645).

When the process of S645 is completed, the device cooperation portion 25*a* notifies the setting assistance device 320 that the new registration of the image processing device 30 was successful (S646).

Upon receipt of the notification in S646, the setting assistance portion 326*a* of the setting assistance device 320 connects to the image processing device 30 using the serial number and the IP address read in S631 (S647), and transmits the settings indicated in the device setting information 325*b* to the image processing device 30 (S648).

When the process of S648 is completed, the system cooperation portion 38*a* of the image processing device 30 overwrites and saves the settings transmitted from the setting assistance device 320 in S648 in the program setting information 37*c* (S649).

When the process of S649 is completed, the system cooperation portion 38*a* notifies the setting assistance device 320 that the setting for the system cooperation program 37*a* of the image processing device 30 was successful (S650).

When the process of S650 is completed, the setting assistance portion 326*a* of the setting assistance device 320 displays on the display portion 322 that the new registration of the image processing device 30 to the device cooperation system 20 and the setting for the system cooperation program 37*a* of the image processing device 30 were successful (S651), and ends the operation shown in FIG. 26.

Described above is an operation of the image processing system according to the present embodiment when the setting for the system cooperation program 37*a* of the image processing device 30 is executed. The image processing system according to the present embodiment operates in the same manner when the setting for the system cooperation program of an image processing device other than the image processing device 30, such as the image processing device 40, is executed.

As described above, in the image processing system according to the present embodiment, when the setting assistance device 320 requests in S635 the device cooperation system 20 to register an image processing device using information read in S631 from a code, if the device cooperation system 20 has already registered or newly registered the image processing device, the setting assistance device 320 transmits the settings for image processing devices to the image processing device (S639 and S648), and if the device cooperation system 20 has neither registered nor newly registered the image processing device, the setting assistance device 320 does not transmit the settings for the image processing device to the image processing device (S644) and the image processing device reflects the settings transmitted from the setting assistance device 320 to the image processing device (S640 and S649), thereby limiting the reflection of settings.

In the image processing system according to the present embodiment, the image processing device can reflect the settings for image processing devices to the image processing device within the limits of the number of licenses allowed.

Since the image processing system according to the present embodiment uses a code to execute the setting for the image processing device, it can facilitate the execution of the setting for the image processing device even when reflecting the setting for the image processing device in many image processing devices.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A device setting system comprising:

an electronic device; and a device cooperation system in which the electronic device is registered and which is configured to cooperate with the registered electronic device, wherein the electronic device is configured to:

from a code in which setting information for the electronic device is embedded, read the setting information;

connect to the device cooperation system using information included in the setting information read from the code; and when the connection to the device cooperation system is successful, request the device cooperation system to register the electronic device, the device cooperation system is configured to, when registration of the electronic device is requested from the electronic device, determine whether or not re-registration or new registration of the electronic device is possible, and the electronic device is further configured to:

reflect the setting information read from the code to the electronic device when the device cooperation system determines that re-registration or new registration of the electronic device is possible; and refrain from reflecting the setting information read from the code to the electronic device when the device cooperation system determines that re-registration of the electronic device is not possible and new registration of the electronic device is not possible.

2. The device setting system according to claim 1, wherein the setting information includes an organization name of an organization to which the electronic device belongs, the electronic device is configured to:

connect to an area of the device cooperation system corresponding to the organization name included in the setting information read from the code; and when the connection to the area of the device cooperation system is successful, request the device cooperation system to register the electronic device, and the device cooperation system is configured to:

when registration of the electronic device is requested from the electronic device and the electronic device is already registered, determine that re-registration of the electronic device is possible;

when registration of the electronic device is requested from the electronic device, the electronic device is unregistered, and a number of registered other electronic devices belonging to the same organization as the electronic device in the device cooperation system has not reached a number of licenses allocated to the organization to which the electronic device belongs, determine that new registration of the electronic device is possible; and when registration of the electronic device is requested from the electronic device, the electronic device is unregistered, and the number of registered other electronic devices belonging to the same organization as the electronic device in the device cooperation system has reached the number of licenses allocated to the organization to which the electronic device belongs, determine that re-registration of the electronic device is not possible and new registration of the electronic device is not possible.

* * * * *